United States Patent
Wang

(10) Patent No.: US 12,328,218 B2
(45) Date of Patent: Jun. 10, 2025

(54) SIGNAL PROCESSING METHOD AND COMMUNICATION APPARATUS

(71) Applicant: HUAWEI TECHNOLOGIES CO., LTD., Guangdong (CN)

(72) Inventor: Xinzheng Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 77 days.

(21) Appl. No.: 18/475,268

(22) Filed: Sep. 27, 2023

(65) Prior Publication Data

US 2024/0031215 A1 Jan. 25, 2024

Related U.S. Application Data

(63) Continuation of application No. PCT/CN2022/088421, filed on Apr. 22, 2022.

(30) Foreign Application Priority Data

Apr. 30, 2021 (CN) .......................... 202110486314.7

(51) Int. Cl.
*H04L 27/26* (2006.01)
*H04L 27/00* (2006.01)

(52) U.S. Cl.
CPC ...... *H04L 27/2666* (2013.01); *H04L 27/0014* (2013.01); *H04L 2027/003* (2013.01)

(58) Field of Classification Search
CPC ............. H04L 27/2647; H04L 27/2613; H04L 27/3863; H04L 25/061; H04L 25/06; H04L 27/2657; H04L 2027/0016; H04L 5/0007; H04W 24/02; H04W 88/06; H04W 84/12; H04W 84/047; H04W 88/08; H04W 88/085; H04W 56/0085; H04W 72/0453; H04B 1/30; H04B 7/0413; H04B 1/0475;
(Continued)

(56) References Cited

U.S. PATENT DOCUMENTS 8,311,137 B1 * 11/2012 Nabar ................... H04L 25/062
375/348
12,047,105 B2 * 7/2024 Ryan ......................... H04B 1/30
(Continued)

OTHER PUBLICATIONS

Chi-Hsiao Yih :"Analysis and Compensation of DC Offset in OFDM Systems Over Frequency-Selective Rayleigh Fading Channels"IEEE Transactions on Vehicular Technology, vol. 58, No. 7, Sep. 2009,total 11 pages.

*Primary Examiner* — Eva Y Puente

(57) ABSTRACT

Embodiments of this application disclose a signal processing method and a communication apparatus, to obtain an estimated value of a receive end-direct current (Rx DC) component based on a sampling point of a signal. In this application, for a specified data frame including one or more direct current (DC) subcarriers or a field in the data frame, the signal is sampled in a first time period to obtain at least one first sampling point, the signal is sampled in a second time period after the first time period to obtain at least one second sampling point corresponding to the at least one first sampling point, and then the estimated value of the Rx DC component is obtained based on the at least one first sampling point, the at least one second sampling point, and a normalized frequency offset.

20 Claims, 7 Drawing Sheets

(58) Field of Classification Search
CPC .. H04B 10/116; H04B 10/1141; H04B 1/707; H04B 1/71637; H04B 1/0064; H04B 1/16
See application file for complete search history.

(56) References Cited

U.S. PATENT DOCUMENTS

| | | | |
|---|---|---|---|
| 2005/0079850 A1* | 4/2005 | Chen | H04L 25/062 |
| | | | 455/323 |
| 2007/0242599 A1 | 10/2007 | Gorday et al. | |
| 2009/0041161 A1 | 2/2009 | Jian et al. | |
| 2010/0022214 A1* | 1/2010 | Hue | H04L 25/063 |
| | | | 455/253.2 |
| 2014/0064418 A1 | 3/2014 | Astrachan | |
| 2015/0280862 A1* | 10/2015 | Teplitsky | H04B 1/30 |
| | | | 375/319 |
| 2016/0099789 A1* | 4/2016 | Zhang | H04J 11/003 |
| | | | 370/329 |
| 2020/0186195 A1* | 6/2020 | Sun | H04L 5/0007 |
| 2022/0173756 A1* | 6/2022 | Wu | H04B 1/0014 |

* cited by examiner

SIGNAL PROCESSING METHOD AND COMMUNICATION APPARATUS

CROSS-REFERENCE TO RELATED APPLICATIONS

This application is a continuation of International Application No. PCT/CN2022/088421, filed on Apr. 22, 2022, which claims priority to Chinese Patent Application No. 202110486314.7, filed on Apr. 30, 2021. The disclosures of the aforementioned applications are hereby incorporated by reference in their entireties.

TECHNICAL FIELD

This application relates to the communication field, and in particular, to a signal processing method and a communication apparatus.

BACKGROUND

A zero intermediate frequency receiver is usually used in a communication apparatus in a wireless local area network (wireless local area network, WLAN) system, and the zero intermediate frequency receiver usually generates a receive end-direct current (receiver-direct current, Rx DC) component. The Rx DC component affects performance of a receiver, and is usually located at frequency 0 of a baseband (in other words, a location at a bandwidth center). To avoid interference of the Rx DC component, it is generally specified that several subcarriers located at the bandwidth center are not used for transmitting data. The subcarriers are severely interfered with by the Rx DC component, and are referred to as DC subcarriers.

When there is a frequency offset or the frequency offset is large, a subcarrier of a signal received by a receiver in a communication apparatus deviates, and an Rx DC component also deviates from a DC subcarrier, so that other subcarriers are affected, especially a data subcarrier close to the DC subcarrier. A frequency offset of the zero intermediate frequency receiver is usually large, and consequently, the signal received by the zero intermediate frequency receiver is severely interfered with by the Rx DC component. Therefore, in a communication system, such as a WLAN system, that is severely affected by an Rx DC component, an estimated value of the Rx DC component needs to be obtained and compensated, to eliminate or reduce impact of the Rx DC component.

Generally, one or more (for example, one, three, or five) DC subcarriers are defined. For a data frame including a plurality of (for example, three or five) DC subcarriers or a field in the data frame, an estimated value of an Rx DC component may be obtained through DC subcarriers outside the bandwidth center. However, if some data frames or fields in the data frames specify only one DC subcarrier, for example, a high-throughput (high throughput, HT), non-high-throughput (non high throughput, non-HT), a very-high-throughput (very high throughput, VHT), or high efficiency (high efficiency, HE) legacy (legacy) part, located at a bandwidth center, a method of obtaining the estimated value of the Rx DC component through the DC subcarrier outside the bandwidth center cannot be used.

SUMMARY

This application provides a signal processing method and a communication apparatus, to obtain an estimated value of an Rx DC component based on a sampling point of a signal.

A first aspect of this application provides a signal processing method. The method may be performed by a communication apparatus, or may be performed by a component (for example, a processor, a chip, or a chip system of the communication apparatus) of the communication apparatus, or may be implemented by a logical module or software that can implement all or some functions of the communication apparatus. In some possible implementations, the communication apparatus may be an access point (access point, AP) or a station (station, STA) in a WLAN system. The AP may be a wireless router, a portable terminal that provides a hotspot connection, or another device that can provide a network connection service. This is not limited herein. The STA may be a device configured to implement a wireless communication function, for example, a terminal or a chip that can be used in a terminal.

The method includes:

sampling a signal in a first time period to obtain at least one first sampling point, and sampling the signal in a second time period after the first time period to obtain at least one second sampling point corresponding to the at least one first sampling point, where the at least one second sampling point corresponds to the at least one first sampling point, and the second time period is after the first time period; and then, obtaining an estimated value of a receive end-direct current Rx DC component based on the at least one first sampling point, the at least one second sampling point, and a normalized frequency offset, where the estimated value of the Rx DC component represents an amplitude and a phase of the Rx DC component, and the normalized frequency offset represents a frequency offset of the Rx DC component relative to a direct current (DC) subcarrier. In this case, for a specified data frame of one or more DC subcarriers or a field in the data frame, the estimated value of the Rx DC component may be obtained, so that the Rx DC component can be compensated based on the estimated value of the Rx DC component, to eliminate an unfavorable factor (the Rx DC component) caused by a receive end in the signal, and restore a baseband signal to a maximum extent.

With reference to the first aspect, in some feasible implementations, the first time period is a time period of a cyclic prefix (cyclic prefix, CP) in a first orthogonal frequency division multiplexing (orthogonal frequency division multiplexing, OFDM) symbol, and the second time period is a time period other than that of the CP in the first OFDM symbol. The at least one first sampling point is $\{r(n)|n \in A\}$, $r(n)$ represents a sampling point whose index is n in the first OFDM symbol, A is a subset of $\{n|0 \leq n \leq N_{CP}-1\}$, and $N_{CP}$ is a quantity of sampling points of the CP in the first OFDM symbol; and the at least one second sampling point is $\{r(n+N)|n \in A\}$, $r(n+N)$ represents a sampling point whose index is n+N in the first OFDM symbol, and N is a quantity of sampling points in a part other than the CP in the first OFDM symbol.

In the foregoing implementation, based on a fact that the CP in the first OFDM symbol is a copy of the last segment of a useful symbol, and with reference to front and rear sampling points in the first OFDM symbol, for a specified data frame of one or more DC subcarriers or a field in the data frame, the estimated value of the Rx DC component may be accurately obtained. Because the estimated value of the Rx DC component may be obtained by obtaining a sampling point of a signal of only one OFDM symbol, feasibility is high.

With reference to the first aspect, in some feasible implementations, $\Lambda$ is $\{n|0 \leq n \leq N_{CP}-1\}$, to be specific, all sampling points of a signal on the CP in the first OFDM symbol and a corresponding sampling point of a signal on the useful symbol are used, and there is no need to further screen the sampling point $\{r(n)|0 \leq n \leq N_{CP}-1\}$ of the signal on the CP in the first OFDM symbol. This is simple to implement, and improves feasibility.

With reference to the first aspect, in some feasible implementations, the at least one first sampling point, the at least one second sampling point, the normalized frequency offset, and the estimated value of the Rx DC component meet:

$$\hat{d}_R = \frac{1}{|\Lambda|(\exp(j2\pi\varepsilon)-1)} \sum_{n \in \Lambda} [r(n)\exp(j2\pi\varepsilon) - r(n+N)]$$

$\hat{d}_R$ represents the estimated value of the Rx DC component, exp( ) represents an exponential function with the natural logarithm e as a base, j represents an imaginary number symbol, E represents the normalized frequency offset, r(n) represents the sampling point whose index is n (namely, the at least one first sampling point) in the first OFDM symbol, and r(n+N) represents at least one sampling point whose index is n+N (namely, the at least one second sampling point) in the first OFDM symbol. $\Lambda$ represents an index set of the at least one first sampling point. To be specific, $\{r(n)|n \in \Lambda\}$ represents the at least one first sampling point, $\{r(n+N)|n \in \Lambda\}$ represents the at least one second sampling point, $|\Lambda|$ represents a quantity of sampling points of the at least one first sampling point, a quantity of sampling points of the at least one second sampling point is also $|\Lambda|$, and $\Sigma[\ ]$ represents an accumulation symbol. According to the foregoing implementation, the estimated value of the Rx DC component is obtained based on the at least one first sampling point $\{r(n)|n \in \Lambda\}$, the at least one second sampling point $\{r(n+N)|n \in \Lambda\}$, and the normalized frequency offset $\varepsilon$.

With reference to the first aspect, in some feasible implementations, $r_1(n)$ represents a value obtained by performing correction on $r(n)$, and $r_1(n+N)$ represents a value obtained by performing correction on $r(n+N)$, to be specific, $$r_1(n) = r(n) \cdot \exp\left(-j\frac{2\pi}{N}\varepsilon n\right) \text{ and } r_1(n+N) = r(n+N) \cdot \exp\left(-j\frac{2\pi}{N}\varepsilon (n+N)\right),$$

to obtain the value $r_1(n)$ obtained by performing correction on $r(n)$ and the value $r_1(n+N)$ obtained by performing correction on $r(n+N)$. At least one first sampling point $\{r_1(n)|n \in \Lambda\}$ after the correction, at least one second sampling point $\{r_1(n+N)|n \in \Lambda\}$ after the correction, and the normalized frequency offset and the estimated value of the Rx DC component meet:

$$\hat{d}_R = \frac{1}{|\Lambda|(1-\exp(-j2\pi\varepsilon))\sum_{n \in \Lambda} \exp\left(-j\frac{2\pi}{N}\varepsilon n\right)} \sum_{n \in \Lambda}[r_1(n)-r_1(n+N)]$$

$\hat{d}_R$ represents the estimated value of the Rx DC component, A represents the index set of the at least one first sampling point, $|\Lambda|$ represents the quantity of the sampling points of the at least one first sampling point, the quantity of the sampling points of the at least one second sampling point is also $|\Lambda|$, exp( ) represents the exponential function with the natural logarithm e as the base, j represents the imaginary number symbol, E represents the normalized frequency offset, and $\Sigma[\ ]$ represents the accumulation symbol. According to the foregoing implementation, the estimated value of the Rx DC component is obtained based on the at least one first sampling point $\{r(n)|n \in \Lambda\}$, the at least one second sampling point $\{r(n+N)|n \in \Lambda\}$, and the normalized frequency offset $\varepsilon$.

According to the foregoing implementation, the estimated value of the Rx DC component is obtained based on the at least one first sampling point $\{r_1(n)|n \in \Lambda\}$ after the correction, the at least one second sampling point $\{r_1(n+N)|n \in \Lambda\}$ after the correction, and the normalized frequency offset $\varepsilon$.

With reference to the first aspect, in some feasible implementations, the first time period is a time period of a first OFDM symbol, the second time period is a time period of a second OFDM symbol, and the first OFDM symbol and the second OFDM symbol do not overlap or partially overlap in time domain. The at least one first sampling point is $\{r(m_1, n)|n \in \Lambda 1\}$, $m_1$ is an index of the first OFDM symbol, and $r(m_1, n)$ represents a sampling point whose index is n in the first OFDM symbol, where $\Lambda 1$ is a subset of $\{n|0 \leq n \leq N+N_{CP}-1\}$, $N_{CP}$ is a quantity of sampling points of a CP in the first OFDM symbol and a quantity of sampling points of a CP in the second OFDM symbol, and N is a quantity of sampling points in a part other than the CP in the first OFDM symbol and a quantity of sampling points in a part other than the CP in the second OFDM symbol. The at least one second sampling point is $\{r(m_2, n)|n \in \Lambda 2\}$, $m_2$ is an index of the second OFDM symbol, and $r(m_2, n)$ represents a sampling point whose index is n in the second OFDM symbol, where $\Lambda 2$ is a subset of $\{n|0 \leq n \leq N+N_{CP}-1\}$.

In this implementation, with reference to sampling points of the first OFDM symbol and the second OFDM symbol, for a specified data frame of one or more DC subcarriers or a field in the data frame, the estimated value of the Rx DC component may be obtained. Because the estimated value of the Rx DC component can be obtained by obtaining sampling points of signals of only two OFDM symbols, feasibility is high.

With reference to the first aspect, in some feasible implementations, the at least one first sampling point, the at least one second sampling point, the normalized frequency offset, and the estimated value of the Rx DC component meet:

$$\hat{d}_R = \frac{A_{TDA}(m_1)\eta - A_{TDA}(m_2)}{\eta - 1}$$

$\hat{d}_R$ represents the estimated value of the Rx DC component, $A_{TDA}(m_1)$ represents a time-domain average value of sampling points (namely, the at least one first sampling point) obtained by performing sampling on a signal of an OFDM symbol whose index is $m_1$, $A_{TDA}(m_2)$ represents a time-domain average value of sampling points (namely, the at least one second sampling point) obtained by performing sampling on a signal of an OFDM symbol whose index is $m_2$. To be specific, $$A_{TDA}(m_1) = \frac{1}{|\Lambda 1|}\sum_{n \in \Lambda 1} r(m_1, n), \text{ and}$$

-continued $$A_{TDA}(m_2) = \frac{1}{|\Lambda 2|} \sum_{n \in \Lambda 2} r(m_2, n).$$

η is an intermediate variable, $\eta=\exp(j(\theta_{m_2}-\theta_{m_1}))$, $\theta_{m_1}$ represents an initial phase of a first OFDM symbol whose index is $m_1$, and $\theta_{m_2}$ represents an initial phase of a second OFDM symbol whose index is $m_2$. According to the foregoing implementation, the estimated value of the Rx DC component is obtained based on the at least one first sampling point $\{r(m_1, n)|n\in \Lambda 1\}$, the at least one second sampling point $\{r(m_2, n)|n\in \Lambda 2\}$, and the normalized frequency offset ε.

With reference to the first aspect, in some feasible implementations, $\Lambda 1=\Lambda 2=\{n|N_{CP}\leq n\leq N+N_{CP}-1\}$. To be specific, all sampling points of a useful symbol in the first OFDM symbol and the second OFDM symbol are used, and there is no need to further screen sampling points of a signal on the useful symbol. This is simple to implement, and improves feasibility.

With reference to the first aspect, in some feasible implementations, if the first OFDM symbol and the second OFDM symbol partially overlap in time domain, the first OFDM symbol is for carrying a signal corresponding to a non-high-throughput long training field (non-HT (legacy) long training field, L-LTF) 0, and the second OFDM symbol is for carrying a signal corresponding to an L-LTF1. Signals corresponding to the L-LTF0 and the L-LTF1 are common signals that are easily obtained, and are for obtaining the estimated value of the Rx DC component. Therefore, feasibility is high.

With reference to the first aspect, in some feasible implementations, if the first OFDM symbol and the second OFDM symbol do not overlap in time domain, the first OFDM symbol is for carrying a signal corresponding to a non-high-throughput signaling field (non-HT (legacy) signaling field, L-SIG), and the second OFDM symbol is for carrying a signal corresponding to a repeated non-high-throughput signaling field (repeated non-HT (legacy) signaling field, RL-SIG). Signals corresponding to the L-SIG and the RL-SIG are common signals that are easily obtained, and are for obtaining the estimated value of the Rx DC component. Therefore, feasibility is high.

With reference to the first aspect, in some feasible implementations, correction is performed on a sampling point in the at least one first sampling point and a sampling point in the at least one second sampling point, to obtain at least one first sampling point after the correction and at least one second sampling point after the correction. The estimated value of the Rx DC component is obtained based on the at least one first sampling point after the correction, the at least one second sampling point after the correction, and the normalized frequency offset. Based on uniform sampling performed on useful symbols of the first OFDM symbol and the second OFDM symbol, at least one first sampling point and at least one second sampling point are obtained. For a specified data frame of one or more DC subcarriers or a field in the data frame, the estimated value of the Rx DC component may be obtained. For different processing procedures of a signal, the estimated value of the Rx DC component may be accurately obtained before or after the correction, and flexibility is high.

With reference to the first aspect, in some feasible implementations, after correction is performed on the at least one first sampling point $\{r(m_1, n)|n\in\Lambda 1\}$, at least one first sampling point $\{r_1(m_1, n)|n\in\Lambda 1\}$ after the correction is obtained, where $$r_1(m_1, n) = r(m_1, n) \cdot \exp\left(-j\left(\frac{2\pi}{N}\varepsilon n + \theta_{m_1}\right)\right)$$

$\theta_{m_1}$ is an initial phase (namely, a phase of the $1_{st}$ sampling point of the first OFDM symbol) of an OFDM symbol (namely, the first OFDM symbol) whose index is $m_1$.

After correction is performed on the at least one second sampling point $\{r(m_2, n)|n\in\Lambda 2\}$, at least one second sampling point $\{r_2(m_2, n)|n\in\Lambda 2\}$ after the correction is obtained, where $$r_1(m_2, n) = r(m_2, n) \cdot \exp\left(-j\left(\frac{2\pi}{N}\varepsilon n + \theta_{m_2}\right)\right)$$

$\theta_{m_2}$ is an initial phase (namely, a phase of the $1^{st}$ sampling point of the second OFDM symbol) of an OFDM symbol (namely, the second OFDM symbol) whose index is $m_2$.

With reference to the first aspect, in some feasible implementations, the at least one first sampling point after the correction, the at least one second sampling point after the correction, the normalized frequency offset, and the estimated value of the Rx DC component meet:

$$\hat{d}_R = \frac{A1_{TDA}(m_1) - A1_{TDA}(m_2)}{\eta(m_1) - \eta(m_2)}$$

$\hat{d}_R$ represents the estimated value of the Rx DC component, $A1_{TDA}(m_1)$ represents a time-domain average value of the at least one first sampling point $\{r_1(m_1, n)|n\in\Lambda 1\}$ after the correction, and $A1_{TDA}(m_2)$ represents a time-domain average value of the at least one second sampling point $\{r_1(m_2, n)|n\in\Lambda 2\}$ after the correction. To be specific, $$A1_{TDA}(m_1) = \frac{1}{|\Lambda 1|}\sum_{n\in\Lambda 1} r_1(m_1, n), \text{ and}$$

$$A1_{TDA}(m_2) = \frac{1}{|\Lambda 2|}\sum_{n\in\Lambda 2} r_1(m_2, n).$$

$\eta(m_1)$ is an intermediate variable of the first OFDM symbol whose index is $m_1$, and $\eta(m_2)$ is an intermediate variable of the second OFDM symbol whose index is $m_2$. To be specific:

$$\eta(m_1) = \frac{1}{|\Lambda 1|}\sum_{n\in\Lambda 1}\exp\left(-j\left(\frac{2\pi}{N}\varepsilon n + \theta_{m_1}\right)\right)$$

$$\eta(m_2) = \frac{1}{|\Lambda 2|}\sum_{n\in\Lambda 2}\exp\left(-j\left(\frac{2\pi}{N}\varepsilon n + \theta_{m_2}\right)\right)$$

According to the foregoing implementation, the estimated value of the Rx DC component is obtained based on the at least one first sampling point $\{r_1(m_1, n)|n\in\Lambda 1\}$ after the correction, the at least one second sampling point $\{r_1(m_2, n)|n\in\Lambda 2\}$ after the correction, and the normalized frequency offset ε.

With reference to the first aspect, in some feasible implementations, a signal is sampled in a plurality of time periods to obtain at least one sampling point in the plurality of time periods, correction is performed on the at least one sampling point in the plurality of time periods to obtain the at least one sampling point in the plurality of time periods after the correction, and the estimated value of the Rx DC component is obtained based on the at least one sampling point in the plurality of time periods after the correction and the normalized frequency offset. The at least one sampling point in the plurality of time periods after the correction, the normalized frequency offset, and the estimated value of the Rx DC component meet the following equation:

$$\begin{bmatrix} \hat{d}_T \\ \hat{d}_R \end{bmatrix} = (P^H P)^{-1} P^H A$$

$\hat{d}_R$ represents the estimated value of the Rx DC component, $\hat{d}_T$ represents an estimated value of a Tx DC component, $(\cdot)^H$ represents conjugate transposition, $(\cdot)^{-1}$ represents matrix inversion, $\hat{d}_T$ represents an estimated value of a transmit end-direct current (Tx-Direct Current, Tx DC) component, and both P and A are intermediate values.

$$P = \begin{bmatrix} 1 & \eta(m_1) \\ 1 & \eta(m_2) \\ \vdots & \vdots \\ 1 & \eta(m_M) \end{bmatrix}$$

$$\eta(m_i) = \frac{1}{|\Lambda i|} \sum_{n \in \Lambda i} \exp\left(-j\left(\frac{2\pi}{N}\varepsilon n + \theta 1_{m_i}\right)\right)$$

i=1, 2, . . . , M. Λi is at least one sampling point of a signal of an OFDM symbol whose index is $m_i$, |Λi| is a quantity of sampling points in Λi, exp( ) represents the exponential function with the natural logarithm e as the base, j represents the imaginary number symbol, E represents the normalized frequency offset, and $\theta 1_{m_i}$ is a phase difference between an initial phase (namely, $\theta_{m_i}$) of the OFDM symbol whose index is $m_i$ and an initial phase of a preset OFDM symbol (for example, an initial phase $\theta_g$ of an OFDM symbol whose index is g).

$$A = \begin{bmatrix} A1_{TDA}(m_1) \\ A1_{TDA}(m_2) \\ \vdots \\ A1_{TDA}(m_M) \end{bmatrix}$$

$A1_{TDA}(m_i)$ (i=1, 2, 3, . . . , M) represents an average value of at least one sampling point of the signal of the OFDM symbol whose index is $m_i$ after correction.

In the foregoing implementation, based on uniform sampling performed on useful symbols of a plurality of OFDM symbols, a plurality of groups of at least one sampling point are obtained. With reference to the plurality of groups of at least one sampling point, for a specified data frame of one or more DC subcarriers or a field in the data frame, the estimated value of the Rx DC component may be accurately obtained.

With reference to the first aspect, in some feasible implementations, a communication apparatus obtains a historical estimated value of the Rx DC component, and the communication apparatus obtains a current estimated value of the Rx DC component. The communication apparatus performs weighted averaging based on the historical estimated value and the current estimated value of the Rx DC component, to obtain an estimated value of the Rx DC component. This further improves accuracy of the estimated value of the Rx DC component.

For example, there are h−1 historical estimated values of the Rx DC component, which are $\hat{d}_R(m_i)$, (i=1, 2, . . . , h−1). The current estimated value of the Rx DC component is $\hat{d}_R(m_h)$, where $m_i$ is an index of an OFDM symbol, and $\hat{d}_R(m_i)$ represents an estimated value of the Rx DC component calculated when the communication apparatus receives the OFDM symbol whose index is $m_i$. A same method (for example, a method in a same embodiment) may be used to calculate different $\hat{d}_R(m_i)$, or different methods (for example, methods in different embodiments) may be used to calculate different $\hat{d}_R(m_i)$. This is not limited herein. In some feasible implementations, in a time sequence, the OFDM symbol whose index is $m_i$ is earlier than an OFDM symbol whose index is $m_{i+1}$. Optionally, the OFDM symbol whose index is $m_{i+1}$ is a next OFDM symbol of the OFDM symbol whose index is $m_i$.

The weighted averaging is performed on $\hat{d}_R(m_i)$ (i=1, 2, . . . , h) through a method of fixed coefficient alpha (alpha) filtering, to obtain $\tilde{d}_R(m_h)$:

$$\tilde{d}_R(m_h) = \begin{cases} \hat{d}_R(m_h), & h = 1 \\ \alpha \cdot \hat{d}_R(m_{h-1}) + (1-\alpha) \cdot \hat{d}_R(m_h), & h > 1 \end{cases}$$

$\tilde{d}_R(m_h)$ obtained in the foregoing implementation is used as the estimated value of the Rx DC component, a is a weight of $\hat{d}_R(m_{h-1})$, and 1−α is a weight of $\hat{d}_R(m_h)$.

In the foregoing implementation, the weighted averaging is performed on the historical estimated value and the current estimated value of the Rx DC component, to improve accuracy of estimating the Rx DC component.

With reference to the first aspect, in some feasible implementations, α changes with h, is denoted as $\alpha_h$, and is referred to as variable coefficient alpha (alpha) filtering. To be specific:

$$\tilde{d}_R(m_h) = \begin{cases} \hat{d}_R(m_h), & h = 1 \\ \alpha_h \cdot \hat{d}_R(m_{h-1}) + (1-\alpha_h) \cdot \hat{d}_R(m_h), & h > 1 \end{cases}$$

With reference to the first aspect, in some possible implementations, the weighted averaging may be further performed through a method of combining the fixed coefficient (alpha) filtering and the variable coefficient (alpha) filtering. For example, when $1 \leq h_1 < M_1$, $\alpha_{h1}$ changes with h1; and when $M_1 \leq h2 \leq M$, $\alpha_{h2}$ does not change with h2 (where $1 < M1 \leq M$). This is not limited herein.

In the foregoing implementation, different methods or method combinations may be selected for different processing delay requirements, so that flexibility is high.

With reference to the first aspect, in some feasible implementations, if the normalized frequency offset is less than or equal to a preset threshold, the estimated value of the Rx DC component is 0; and if the normalized frequency offset is greater than the preset threshold, the estimated value of the Rx DC component is obtained based on the at least one first sampling point, the at least one second sampling point, and the normalized frequency offset. When the normalized frequency offset E is equal to 0 or close to 0, the Rx DC component does not affect performance of a receiver, or impact on the performance of the receiver may be ignored. Therefore, the estimated value of the Rx DC component does not need to be obtained, and processing complexity is reduced, so that power consumption is reduced.

A second aspect of this application provides a communication apparatus. The communication apparatus can implement the method according to any one of the first aspect or the possible implementations of the first aspect. The apparatus includes a corresponding unit or component configured to perform the foregoing method. The unit included in the apparatus may be implemented by software and/or hardware.

A third aspect of this application provides a communication apparatus, including a processor, where the processor is coupled to a memory. The memory is configured to store instructions, and when the instructions are executed by the processor, the apparatus is enabled to implement the method according to any one of the first aspect or the possible implementations of the first aspect.

A fourth aspect of this application provides a computer-readable storage medium, where the computer-readable storage medium stores instructions, and when the instructions are run on a computer, the computer is enabled to perform the method according to any one of the first aspect or the possible implementations of the first aspect.

A fifth aspect of this application provides a computer program product, where the computer program product includes computer-executable instructions, and when the computer-executable instructions are run on a computer, the computer is enabled to perform the method according to any one of the first aspect or the possible implementations of the first aspect.

A sixth aspect of this application provides a chip system, including a processor, where the processor is coupled to a memory, the memory is configured to store instructions, and when the instructions are executed by the processor, the chip system is enabled to implement the method according to any one of the first aspect or the possible implementations of the first aspect.

For technical effects brought by any one of the third aspect to the sixth aspect or the possible implementations of the third aspect to the sixth aspect, refer to the technical effects brought by the first aspect or the different possible implementations of the first aspect. Details are not described herein again.

It can be learned from the foregoing technical solutions that, in embodiments of this application, a signal is sampled in a first time period to obtain at least one first sampling point, the signal is sampled in a second time period after the first time period to obtain at least one second sampling point corresponding to the at least one first sampling point, and then an estimated value of a receive end-direct current Rx DC component is obtained based on the at least one first sampling point, the at least one second sampling point, and a normalized frequency offset. In this case, for a specified data frame of one or more DC subcarriers or a field in the data frame, the estimated value of the Rx DC component may be obtained, so that the Rx DC component can be compensated based on the estimated value of the Rx DC component, to eliminate an unfavorable factor (the Rx DC component) caused by a receive end in the signal and restore a baseband signal to a maximum extent.

BRIEF DESCRIPTION OF DRAWINGS

FIG. 1-2 is a schematic diagram of a location of an Rx DC component when there is no frequency offset or a frequency offset is small;

FIG. 1-3 is a schematic diagram of a location of an Rx DC component when a frequency offset exists or a frequency offset is large;

FIG. 2-1 is a schematic diagram of a signal processing method according to this application;

FIG. 2-2 is a schematic diagram of a structure of a first OFDM symbol according to an embodiment of this application;

FIG. 3 is a schematic diagram of another signal processing method according to this application;

FIG. 4-1 is a schematic diagram of another signal processing method according to this application;

FIG. 4-2 is a schematic diagram of an L-LTF0 and an L-LTF1 according to this application;

FIG. 4-3 is a schematic diagram of an L-SIG and an RL-SIG according to this application;

DESCRIPTION OF EMBODIMENTS

Embodiments of this application provide a signal processing method and a communication apparatus, to obtain an estimated value of an Rx DC component based on a sampling point of a signal.

The following describes embodiments of this application with reference to the accompanying drawings.

In the specification, claims, and accompanying drawings of this application, the terms "first", "second", and the like are intended to distinguish between similar objects but do not necessarily indicate a specific order or sequence. It should be understood that the terms used in such a way are interchangeable in proper circumstances, which is merely a distinguishing manner that is used when objects with a same attribute are described in embodiments of this application. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

This application may be applied to a plurality of communication systems, for example, a WLAN system, a long term evolution (long term evolution, LTE) system, a new radio (new radio, NR) system, a wireless fidelity (wireless-fidelity, Wi-Fi) system, and a future evolution communication system; or may be applied to another wireless communication system, for example, an orthogonal frequency division multiple access (orthogonal frequency-division multiple access, OFDMA), a single-carrier frequency division multiple access (single carrier FDMA, SC-FDMA), a satellite communication system, a non-terrestrial network (non-terrestrial network, NTN), or an internet of things (internet of things, IoT) system. This is not specifically limited in embodiments of this application. The following uses the WLAN system as an example for description.

Figure 1:
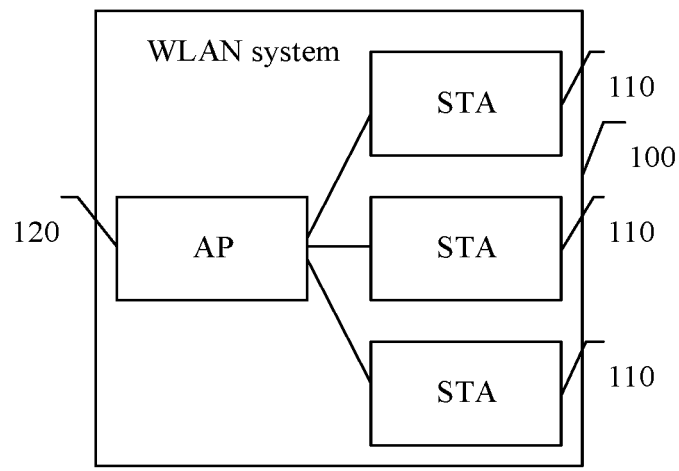
FIG. 1-1 is a schematic diagram of a structure of a WLAN system to which an embodiment of this application is applied.

As shown in FIG. 1-1, this application may be applied to a WLAN system 100, where the WLAN system 100 includes at least one access point (access point, AP) 120 and at least one station (station, STA) 110.

The WLAN system 100 is a local area network using a wireless channel as a transmission medium, and is an important supplement and extension of a wired networking manner. The AP 120 is configured to connect the STA 110 to an existing wired or wireless network. In some feasible implementations, the AP 120 may be a wireless router, a portable terminal that provides a hotspot connection, or another device that can provide a network connection service. This is not limited herein.

The STA 110 in this application may be a device configured to implement a wireless communication function, for example, a terminal or a chip that may be used in a terminal. The terminal may be user equipment (user equipment, UE), an access terminal, a terminal unit, a terminal station, a mobile station, a remote station, a remote terminal, a mobile device, a wireless communication device, a terminal agent, a terminal apparatus, or the like in an IoT, a 5G network, or a future evolution PLMN. The access terminal may be a cellular phone, a cordless phone, a session initiation protocol (session initiation protocol, SIP) phone, a wireless local loop (wireless local loop, WLL) station, a personal digital assistant (personal digital assistant, PDA), a handheld device or a computing device with the wireless communication function, another processing device connected to a wireless modem, a vehicle-mounted device, a wearable device, a virtual reality (virtual reality, VR) terminal device, an augmented reality (augmented reality, AR) terminal device, a wireless terminal in industrial control (industrial control), a wireless terminal in self-driving (self-driving), a wireless terminal in telemedicine (telemedicine), a wireless terminal in a smart grid (smart grid), a wireless terminal in transportation safety (transportation safety), a wireless terminal in a smart city (smart city), a wireless terminal in a smart home (smart home), or the like. The terminal may be mobile or fixed.

The communication system shown in FIG. 1-1 is only used as an example, but is not intended to limit the technical solutions in this application. A person skilled in the art should understand that, in a specific implementation process, the communication system may further include another device. This is not limited.

A communication apparatus (the AP 120 or the STA 110) of the WLAN system 100 receives and processes a signal by using a built-in receiver (for example, a zero intermediate frequency receiver). When the receiver receives the signal, a receive end-direct current (receiver-direct current, Rx DC) component is usually generated, thereby interfering with the signal and affecting performance of the receiver. Because the Rx DC component is usually located at a frequency 0 of a baseband (in other words, a location at a bandwidth center), to avoid interference of the Rx DC component, it is generally specified that several subcarriers located at the bandwidth center are not used for transmitting data. The subcarriers are severely interfered with by the Rx DC component, and are referred to as DC subcarriers.

Figures 1, 2:
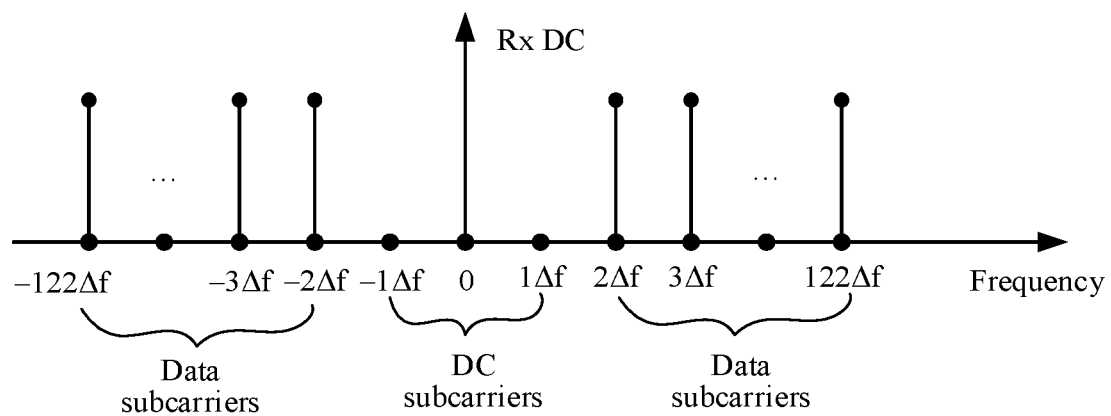
Figures 1, 2, 3:
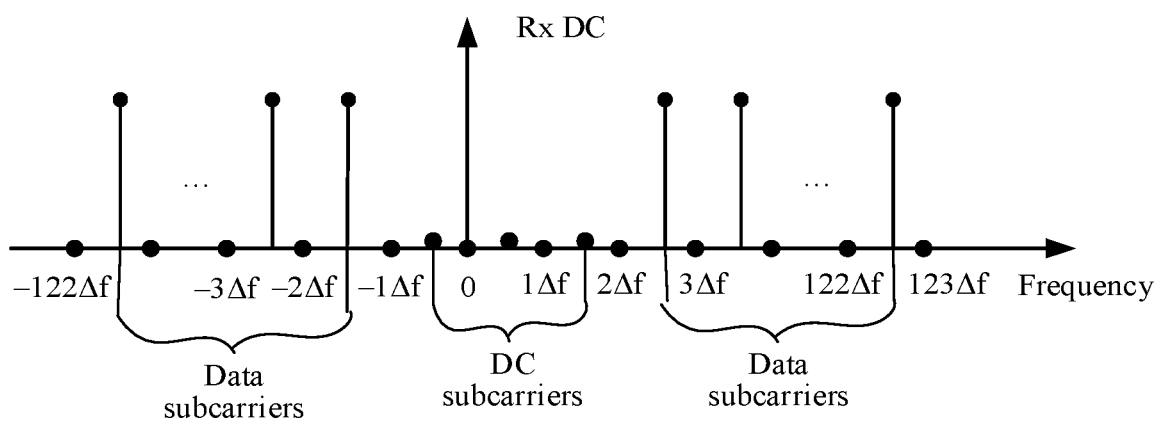
Figures 1, 2:
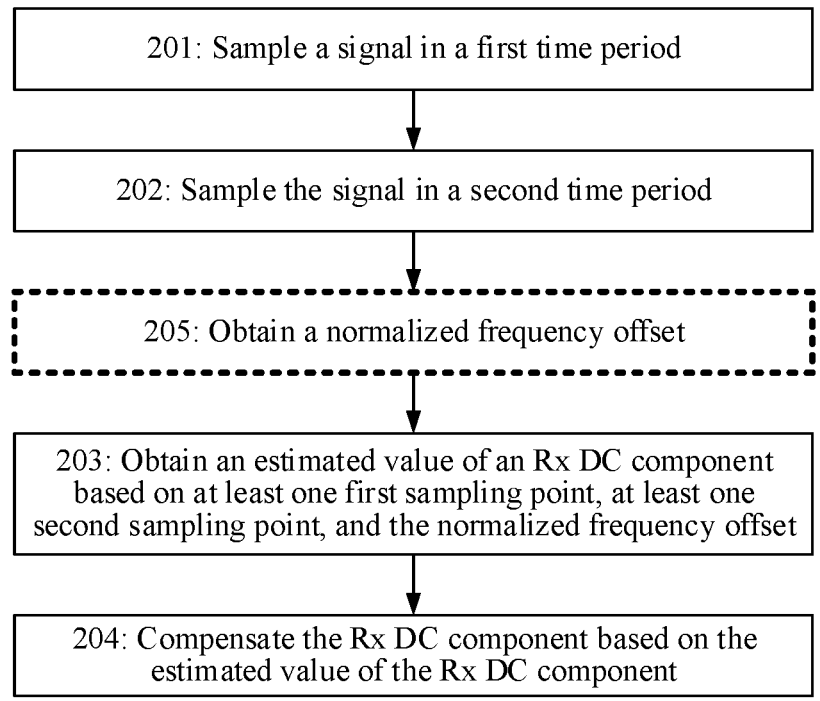
Figure 2:
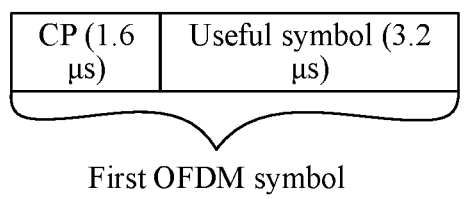
Figure 3:
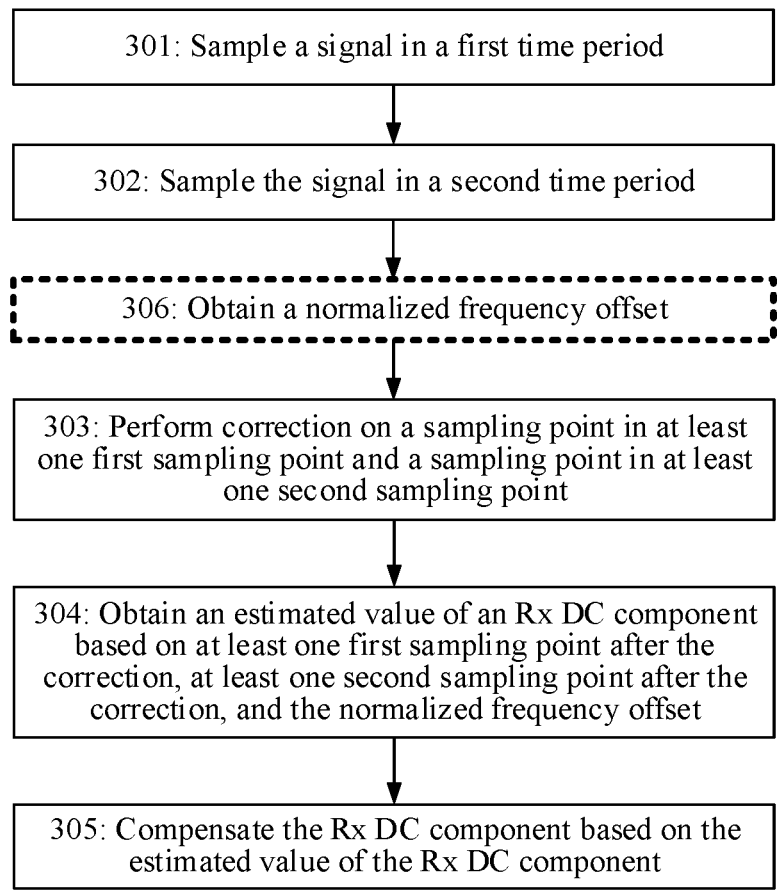

As shown in FIG. 1-2, when there is no frequency offset or a frequency offset is small, an Rx DC component is on a DC subcarrier (where $\Delta f$ is a subcarrier spacing). As shown in FIG. 1-3, when a frequency offset exists or a frequency offset is large, an Rx DC component deviates from a DC subcarrier, so that a data subcarrier that is close to the DC subcarrier is affected. A frequency offset of a zero intermediate frequency receiver is usually large, and consequently, a signal received by the zero intermediate frequency receiver is severely affected by an Rx DC component. Therefore, in a communication system that is severely affected by the Rx DC component, such as the WLAN system 100, an estimated value of the Rx DC component needs to be obtained and compensated, to eliminate or reduce impact of the Rx DC component.

It should be noted that, in a receiver used in the WLAN system 100, a reason why a frequency offset of the receiver is large includes but is not limited to:

First, crystal oscillator precision is low.

A specified crystal oscillator precision of the receiver used in the WLAN system 100 is within ±20 parts per million (parts per million, ppm), and a frequency offset of 40 ppm may be generated in a worst scenario.

Second, an applied frequency band is high.

The frequency band applied in the WLAN system 100 continues to increase, from a 2.4 GHz frequency band to a 5 GHz frequency band, and then a 6 GHz frequency band is allocated. Under a same value of ppm, the higher the frequency band, the larger the frequency offset of the receiver.

Third, a transmitter does not perform pre-correction on a frequency.

Currently, in most scenarios, the transmitter used in the WLAN system does not perform the pre-correction on the frequency. Consequently, a frequency offset of a signal received by a receiver further increases.

Currently, for a specified data frame of a plurality of DC subcarriers (for example, 3 or 5) or a field in the data frame, an estimated value of an Rx DC component may be obtained through a DC subcarrier outside a bandwidth center. However, for a specified data frame of only one DC subcarrier or a field in the data frame, such calculation cannot be performed.

Many of different fields of a presentation protocol data unit (presentation protocol data unit, PPDU) that are currently specified have only one DC subcarrier. The formats and fields include:

fields of a high-throughput (high throughput, HT) PPDU, a non-HT (non-HT) PPDU, and a very-high-throughput (very high throughput, VHT) PPDU in a 20 MHz bandwidth;

L-STF, L-LTF (including L-LTF0 and L-LTF1), L-SIG, RL-SIG, and HE-SIG-A fields of a high efficiency single-user (high efficiency single user, HE SU) PPDU, a high efficiency extended-range single-user (high efficiency extended range single user, HE ER SU) PPDU, and a high efficiency trigger-based (high efficiency trigger-based, HE TB) PPDU in the 20 MHz bandwidth; and a legacy short training field (legacy short training field, L-STF), a non-HT (legacy) long training field (non-HT (legacy) long training field, L-LTF) (including an L-LTF0 and an L-LTF1), a non-HT (legacy) signaling field (non-HT (legacy) signaling field, L-SIG), a repeated non-HT (legacy) signaling field (repeated non-HT (legacy) signaling field, RL-SIG), a high efficiency signaling A field (high efficiency signaling-a field, HE-SIG-A), and a high efficiency signaling B field (high efficiency signaling-b field, HE-SIG-B) of an HE MU PPDU in the 20 MHz bandwidth.

Therefore, this application provides a signal processing method. A signal is sampled in a first time period to obtain at least one first sampling point, the signal is sampled in a second time period after the first time period to obtain at least one second sampling point corresponding to the at least one first sampling point, and then an estimated value of a receive end-direct current Rx DC component is obtained based on the at least one first sampling point, the at least one second sampling point, and a normalized frequency offset. In this case, for a specified data frame of one or more DC subcarriers or a field in the data frame, the estimated value of the Rx DC component may be obtained, so that the Rx DC component can be compensated based on the estimated value of the Rx DC component. Because the estimated value of the Rx DC component is accurately obtained, an unfavorable factor (the Rx DC component) caused by a receive end in the signal is eliminated, and a baseband signal is restored to a maximum extent.

For example, this application provides two basic methods to obtain the estimated value of the Rx DC component.

Basic method 1: The estimated value of the Rx DC component is obtained by using front and rear sampling points in an OFDM symbol.

Basic method 2: The estimated value of the Rx DC component is obtained by using two or more sampling points in the OFDM symbol.

Based on the foregoing two basic methods, this application provides six implementations: Embodiment 1 to Embodiment 6. Embodiment 1 and Embodiment 2 are based on the foregoing basic method 1, Embodiment 3 to Embodiment 5 are based on the foregoing basic method 2, and Embodiment 6 is used for performing weighted averaging on the estimated values of the Rx DC components obtained in Embodiment 1 to Embodiment 5, to improve estimation precision.

The following describes each implementation.

Embodiment 1

Refer to FIG. 2-1. This application provides a signal processing method. The method may be performed by a communication apparatus, or may be performed by a component of the communication apparatus (for example, a processor, a chip, or a chip system of the communication apparatus), or may be implemented by a logical module or software that can implement all or some functions of the communication apparatus. In some possible implementations, the communication apparatus may be an access point (access point, AP) or a station (station, STA) in a WLAN system. The AP may be a wireless router, a portable terminal that provides a hotspot connection, or another device that can provide a network connection service. This is not limited herein. The STA may be a device configured to implement a wireless communication function, for example, a terminal or a chip that can be used in a terminal.

The following uses the communication apparatus as an example for description. The method includes the following steps.

201: Sample a signal in a first time period, to obtain at least one first sampling point.

As shown in FIG. 2-2, in this embodiment of this application, a first OFDM symbol includes a CP and a part other than the CP, where the part other than the CP is also referred to as a useful symbol. In this embodiment of this application, the first time period is a time period during which the CP lasts. In some feasible implementations, duration of the CP in time domain is 1.6 microseconds (s).

In this embodiment of this application, the communication apparatus samples a signal on the CP in the first OFDM symbol, to obtain $N_{CP}$ sampling points. The $N_{CP}$ sampling points include at least one first sampling point. In some feasible implementations, the at least one first sampling point may be the $N_{CP}$ sampling points.

In this embodiment of this application, a sampling point whose index is n in sampling points obtained by collecting the first OFDM symbol may be represented as r(n), and the $N_{CP}$ sampling points of the signal on the CP in the first OFDM symbol may be represented as $\{r(n)|0 \leq n \leq N_{CP}-1\}$. Because the $N_{CP}$ sampling points include the at least one first sampling point, the at least one first sampling point may be represented as $\{r(n)|n \in \Lambda\}$, where $\Lambda$ is a subset of $\{n|0 \leq n \leq N_{CP}-1\}$.

It should be noted that, under impact of a multipath fading channel, the CP of the first OFDM symbol may be interfered with by a previous OFDM symbol. If the $N_{CP}$ sampling points of the CP in the first OFDM symbol are used as the at least one first sampling point, accuracy of obtaining an estimated value of an Rx DC component may be reduced. In some possible implementations, to reduce interference caused by the previous OFDM symbol to the first OFDM symbol, the communication apparatus may select some sampling points that are late in time of the $N_{CP}$ sampling points as the at least one first sampling point.

It should be noted that a sampling point may be used as a sampling point in the at least one first sampling point provided that the sampling point is not affected by the multipath fading channel or is not affected by a group delay of a signal filter. This is not limited herein. For example, the first $N_1$ sampling points in the CP of the first OFDM symbol are usually severely affected by the multipath fading channel or the group delay of the signal filter, that is, $\{r(n)|0 \leq n \leq N_1-1\}$. In this case, the communication apparatus may select $N_{CP}-N_1$ sampling points from the $N_{CP}$ sampling points as the at least one first sampling point, that is, $\{r(n)|N_1 \leq n \leq N_{CP}-1\}$.

In some feasible implementations, the impact of the multipath fading channel or the like may be not considered, and all sampling points of the signal on the CP in the first OFDM symbol may be directly selected as the at least one first sampling point, that is, $\Lambda=\{n|0 \leq n \leq N_{CP}-1\}$ is set. There is no need to preferentially select a sampling point $\{r(n)|0 \leq n \leq N_{CP}-1\}$ of the signal on the CP in the first OFDM symbol to select an optimal sampling point. This is simple to implement, and has high feasibility. In this embodiment of this application, the estimated value of the Rx DC component may be obtained provided that at least one first sampling point is selected. This is not limited herein.

202: Sample the signal in a second time period to obtain at least one second sampling point, where the at least one second sampling point corresponds to the at least one first sampling point, and the second time period is after the first time period.

In this embodiment of this application, the second time period is a time period other than that of the CP in the first OFDM symbol, namely, a time period during which the useful symbol lasts. In some feasible implementations, as shown in FIG. 2-2, duration of the useful symbol in the first OFDM symbol in time domain is 3.2 s. In this embodiment of this application, the communication apparatus samples a signal on the useful symbol in the first OFDM symbol, to obtain N sampling points.

In this embodiment of this application, the communication apparatus samples the signal on the useful symbol in the first OFDM symbol, to obtain N sampling points. The N sampling points include the at least one second sampling point.

In this embodiment of this application, the sampling point whose index is n in the sampling points obtained by collecting the first OFDM symbol may be represented as r(n), and the N sampling points of the signal on the useful symbol in the first OFDM symbol may be represented as {r(n)|$N_{CP} \leq n \leq N+N_{CP}-1$}.

In this embodiment of this application, as the CP in the first OFDM symbol is a copy of the last segment of the useful symbol, {r(n+N)|n∈Λ} is selected as the at least one second sampling point. In other words, each sampling point in the at least one second sampling point is an $N^{th}$ sampling point after each sampling point in the at least one first sampling point. It may also be understood as that each sampling point in the at least one second sampling point corresponds to each sampling point in the at least one first sampling point.

203: Obtain the estimated value of the Rx DC component based on the at least one first sampling point, the at least one second sampling point, and a normalized frequency offset.

In this embodiment of this application, the at least one first sampling point {r(n)|n∈Λ}, the at least one second sampling point {r(n+N)|n∈Λ}, the normalized frequency offset ε, and the estimated value of the Rx DC component $\hat{d}_R$ meet the following equation:

Formula 2-1
$$\hat{d}_R = \frac{1}{|\Lambda|(\exp(j2\pi\varepsilon) - 1)} \sum_{n\in\Lambda} [r(n)\exp(j2\pi\varepsilon) - r(n+N)]$$

exp( ) is an exponential function with the natural logarithm e as a base, j represents an imaginary number symbol, E represents the normalized frequency offset, and |Λ| represents a quantity of sampling points of the at least one first sampling point.

For example, the at least one first sampling point is the last $N_1$ sampling points of the CP in the first OFDM symbol, that is, $\zeta=\{n|N_{CP}-N_1 \leq n \leq N_{CP}-1\}$, and the at least one first sampling point is {r(n)|$N_{CP}-N_1 \leq n \leq N_{CP}-1$}, so that the at least one second sampling point is {r(n+N)|$N_{CP}-N_1 \leq n \leq N_{CP}-1$}, and the at least one first sampling point {r(n)|n∈Λ}, the at least one second sampling point {r(n+N)|n∈Λ}, the normalized frequency offset ε, and the estimated values of the Rx DC component $\hat{d}_R$ meet the following equation:

Formula 2-2
$$\hat{d}_R = \frac{1}{N_1(\exp(j2\pi\varepsilon) - 1)} \sum_{n=N_{CP}-N_1}^{N_{CP}-1} [r(n)\exp(j2\pi\varepsilon) - r(n+N)]$$

For another example, the at least one first sampling point is all sampling points in the CP of the first OFDM symbol, that is, $N_1=N_{CP}$, Λ={n|$0 \leq n \leq N_{CP}-1$}, and the at least one first sampling point is {r(n) $0 \leq n \leq N_{CP}-1$}, so that the at least one second sampling point is {r(n+N)|$0 \leq n \leq N_{CP}-1$}, and the at least one first sampling point {r(n)|n∈Λ}, the at least one second sampling point {r(n+N)|n∈Λ}, the normalized frequency offset ε, and the estimated value of the Rx DC component $\hat{d}_R$ meet the following equation:

Formula 2-3
$$\hat{d}_R = \frac{1}{N_{CP}(\exp(j2\pi\varepsilon) - 1)} \sum_{n=0}^{N_{CP}-1} [r(n)\exp(j2\pi\varepsilon) - r(n+N)]$$

In this embodiment of this application, based on a fact that the CP in the first OFDM symbol is a copy of the last segment of the useful symbol, for a specified data frame of one or more specified DC subcarriers or a field in the data frame, the estimated value of the Rx DC component may be obtained by using front and rear sampling points in the first OFDM symbol and an estimated normalized frequency offset, and the estimated value of the Rx DC component is accurately obtained, to eliminate an unfavorable factor (the Rx DC component) caused by a receive end in the signal, and restore a baseband signal to a maximum extent.

204: Compensate the Rx DC component based on the estimated value of the Rx DC component.

In some feasible implementations, a method for compensating the Rx DC component may be subtracting the estimated value of the Rx DC component. It should be noted that the estimated value of the Rx DC component may be a complex number, and represents an amplitude and a phase of the Rx DC component. For example, the estimated value of the Rx DC component is (−1+j), where j is the imaginary number symbol. In this case, a method for compensating the Rx DC component is to subtract (−1+j) from an expression of the sampling point r(n).

Optionally, the signal processing method may further include the following steps.

205: Obtain the normalized frequency offset.

A frequency offset is an amplitude of frequency swing of a frequency-modulated wave, and may generally mean a maximum frequency offset, for example, the frequency offset is 640 kilohertz (kHz). The normalized frequency offset F may be a ratio of the frequency offset to a subcarrier spacing. For example, if 64 subcarriers are carried in a bandwidth of 20 megahertz (MHz), the subcarrier spacing is 20 MHz/64=312.5 kHz. If the frequency offset is 640 kHz, the normalized frequency offset ε=640 kHz/312.5 kHz=2.048.

In some possible implementations, the frequency offset may be estimated based on the received signal, and then the normalized frequency offset is determined based on the subcarrier spacing. In some possible implementations, the normalized frequency offset may alternatively be obtained in advance. This is not limited herein.

In this embodiment of this application, the normalized frequency offset may represent a frequency offset of the Rx DC component relative to a direct current (DC) subcarrier. When the normalized frequency offset E is equal to 0 or close to 0, because the Rx DC component does not affect performance of a receiver, or impact on the performance of the receiver may be ignored, the estimated value of the Rx DC component may not be obtained, and processing complexity is reduced, so that power consumption is reduced. Therefore, in some possible implementations, a preset threshold $Et_h$ may be set. If $|\varepsilon| \leq \varepsilon_{th}$, it is considered that the estimated value of the Rx DC component is 0. Otherwise, if the normalized frequency offset is greater than the preset threshold, a subsequent step of obtaining the estimated value of the Rx DC component based on the at least one first sampling point, the at least one second sampling point, and the normalized frequency offset is performed.

In some possible implementations, the communication apparatus may estimate the normalized frequency offset E by receiving a reference signal, or may estimate the normalized frequency offset E by using a signal received in the following steps. This is not limited herein.

Embodiment 2

Refer to FIG. 3. Embodiment 2 of this application provides a signal processing method, and the method includes the following steps.

301: Sample a signal in a first time period, to obtain at least one first sampling point.

302: Sample the signal in a second time period to obtain at least one second sampling point, where the at least one second sampling point corresponds to the at least one first sampling point, and the second time period is after the first time period.

Step 301 and step 302 are the same as step 201 and step 202, and details are not described herein again.

303: Perform correction on a sampling point in the at least one first sampling point and a sampling point in the at least one second sampling point, to obtain at least one first sampling point after the correction and at least one second sampling point after the correction.

In this embodiment of this application, the correction is performed on a sampling point r(n) (refer to formula 2-2) in the at least one first sampling point, to obtain a sampling point $r_1(n)$ after the correction:

$$r_1(n) = r(n) \cdot \exp\left(-j\frac{2\pi}{N}\varepsilon n\right) \quad \text{Formula 3-1}$$

exp( ) is an exponential function with the natural logarithm e as a base, j represents an imaginary number symbol, and F represents a normalized frequency offset.

After the correction is performed on a sampling point r(n+N) (refer to formula 2-5) in the at least one second sampling point, to obtain $r_1(n+N)$:

$$r_1(n+N) = r(n+N) \cdot \exp\left(-j\frac{2\pi}{N}\varepsilon n\right) \quad \text{Formula 3-2}$$

304: Obtain an estimated value of an Rx DC component based on the at least one first sampling point after the correction, the at least one second sampling point after the correction, and the normalized frequency offset.

In this embodiment of this application, the at least one first sampling point $\{r_1(n)|n\in\Lambda\}$ after the correction, the at least one second sampling point $\{r_1(n+N)|n\in\Lambda\}$ after the correction, the normalized frequency offset ε, and the estimated value of the Rx DC component $\hat{d}_R$ meet the following equation:

$$\hat{d}_R = \frac{1}{(1-\exp(-j2\pi\varepsilon))\sum_{n\in\Lambda}\exp\left(-j\frac{2\pi}{N}\varepsilon n\right)}\sum_{n\in\Lambda}[r_1(n)-r_1(n+N)] \quad \text{Formula 3-3}$$

For example, the last $N_1$ sampling points of a CP in a first OFDM symbol are selected as the at least one first sampling point, that is, $\Lambda=\{n|N_{CP}-N_1\leq n\leq N_{CP}-1\}$, and the at least one first sampling point is $\{r(n)|N_{CP}-N_1\leq n\leq N_{CP}-1\}$, so that the at least one second sampling point is $\{r(n+N)|N_{CP}-N_1\leq n\leq N_{CP}-1\}$, and the at least one first sampling point $\{r1(n)|n\in\Lambda\}$ after the correction, the at least one second sampling point $\{r_1(n+N)|n\in\Lambda\}$ after the correction, the normalized frequency offset ε, and the estimated value of the Rx DC component $\hat{d}_R$ meet the following equation:

$$\hat{d}_R = \frac{1}{(1-\exp(-j2\pi\varepsilon))\sum_{n=N_{CP}-N_1}^{N_{CP}-1}\exp\left(-j\frac{2\pi}{N}\varepsilon n\right)}\sum_{n=N_{CP}-N_1}^{N_{CP}-1}[r_1(n)-r_1(n+N)] \quad \text{Formula 3-4}$$

For another example, all sampling points in the CP of the first OFDM symbol are selected as the at least one first sampling point, that is, $N_1=N_{CP}$, $\Lambda=\{n|0\leq n\leq N_{CP}-1\}$, and the at least one first sampling point is $\{r(n)|0\leq n\leq N_{CP}-1\}$, so that the at least one second sampling point is $\{r(n+N)|0\leq n\leq N_{CP}-1\}$, and the at least one first sampling point $\{r1(n)|n\in\Lambda\}$ after the correction, the at least one second sampling point $\{r1(n+N)|n\in\Lambda\}$ after the correction, the normalized frequency offset ε, and the estimated value of the Rx DC component $\hat{d}_R$ meet the following equation:

$$\hat{d}_R = \frac{1}{(1-\exp(-j2\pi\varepsilon))\sum_{n=0}^{N_{CP}-1}\exp\left(-j\frac{2\pi}{N}\varepsilon n\right)}\sum_{n=0}^{N_{CP}-1}[r_1(n)-r_1(n+N)] \quad \text{Formula 3-5}$$

In this embodiment of this application, based on a fact that the CP in the first OFDM symbol is a copy of the last segment of a useful symbol, for a specified data frame of one or more DC subcarriers or a field in the data frame, after the sampling point is corrected, the estimated value of the Rx DC component may be obtained by using front and rear sampling points after the correction in the first OFDM symbol, to accurately obtain the estimated value of the Rx DC component, so that an unfavorable factor (the Rx DC component) caused by a receive end in the signal is eliminated, and a baseband signal is restored to a maximum extent.

305: Compensate the Rx DC component based on the estimated value of the Rx DC component.

Refer to step 204. Details are not described herein again.

Optionally, the signal processing method may further include the following step.

306: Obtain the normalized frequency offset.

Refer to step 205. Details are not described herein again.

Embodiment 3

Figures 1, 4:
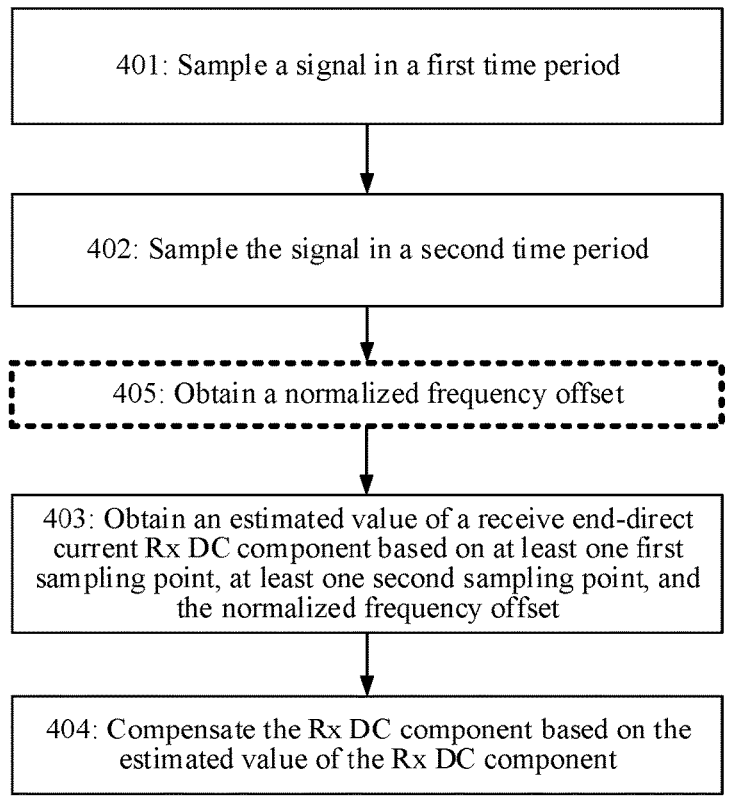
Figures 2, 4:
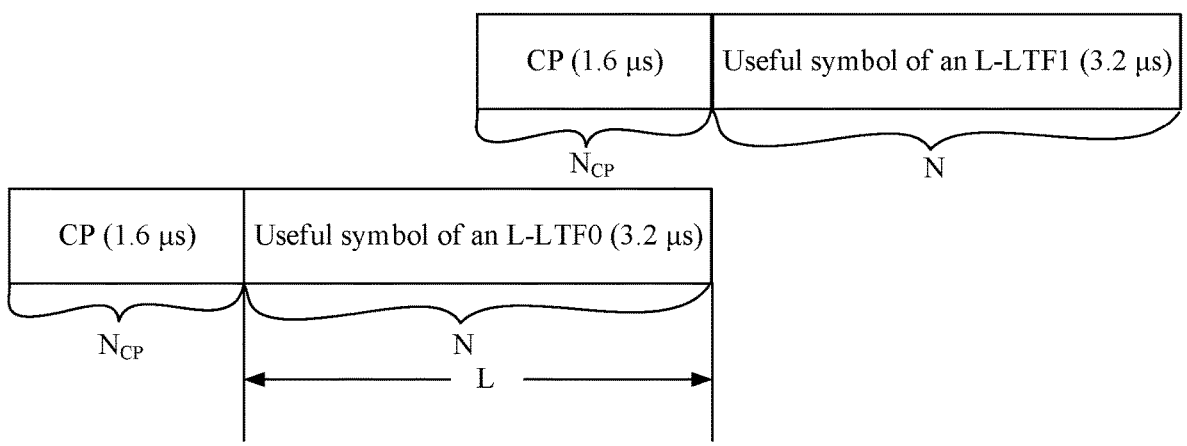
Figures 3, 4:
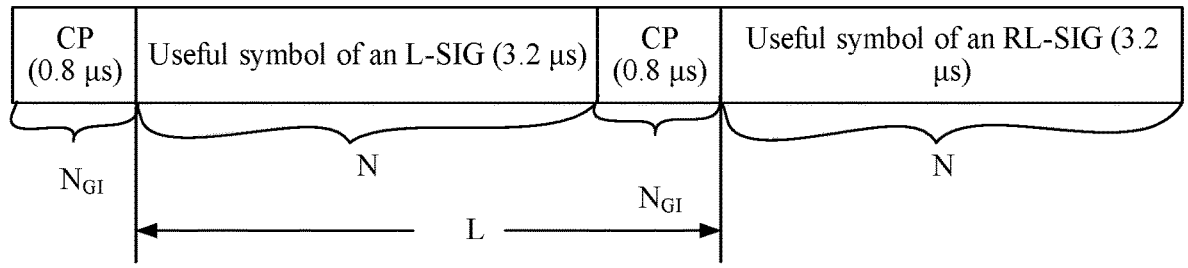

Refer to FIG. 4-1. Embodiment 3 of this application provides a signal processing method, and the method includes the following steps.

401: Sample a signal in a first time period, to obtain at least one first sampling point.

In this embodiment of this application, the first time period is a time period of a first OFDM symbol. In some feasible implementations, as shown in FIG. 2-2, duration of the first OFDM symbol in time domain is 3.2+1.6=4.8 microseconds (s).

In this embodiment of this application, sampling is performed on the signal of the first OFDM symbol, to be specific, the sampling is performed on a signal of a CP in the first OFDM symbol to obtain $N_{CP}$ sampling points, and the sampling is performed on a signal of a useful symbol in the first OFDM symbol to obtain N sampling points, to obtain $N_{CP}+N$ sampling points. The $N_{CP}$ sampling points include the at least one first sampling point. In some feasible implementations, the at least one first sampling point is the N sampling points.

In this embodiment of this application, a sampling point whose index is n in the $N_{CP}+N$ sampling points obtained by collecting the first OFDM symbol whose index is $m_1$ may be represented as $r(m_1, n)$, and the $N_{CP}+N$ sampling points of the first OFDM symbol may be represented as $\{r(m_1, n)|0 \le n \le N+N_{CP}-1\}$.

Because the $N+N_{CP}$ sampling points of the first OFDM symbol include the at least one first sampling point, the at least one first sampling point may be represented as $\{r(m_1, n)|n \in \Lambda\}$, where $\Lambda$ is a subset of $\{n|0 \le n \le N+N_{CP}-1\}$.

It should be noted that, under impact of a multipath fading channel, the CP of the first OFDM symbol may be interfered with by a previous OFDM symbol. If the $N_{CP}$ sampling points of the CP in the first OFDM symbol are used as the at least one first sampling point, accuracy of obtaining an estimated value of an Rx DC component may be reduced. In some possible implementations, to reduce interference caused by the previous OFDM symbol to the first OFDM symbol, some front sampling points in the $N_{CP}$ sampling points may be prevented from being selected as the at least one first sampling point.

It should be noted that, a sampling point that is not affected by the multipath fading channel or a sampling point that is not affected by a group delay of various filters that are passed through during signal processing is selected may be used as a sampling point in the at least one first sampling point. This is not limited herein. For example, according to theoretical analysis and actual tests, sampling points that are affected by the multipath fading channel or severely affected by the group delay of the various filters that are passed through during signal processing are the first $N_1$ sampling points in the CP of the first OFDM symbol, that is, $\{r(m_1, n)|0 \le n \le N_1-1\}$. In this case, sampling points may be selected from $N+N_{CP}-N_1$ sampling points in the $N+N_{CP}$ sampling points as the at least one first sampling point, that is, $\Lambda$ is a subset of $\{n| N1 \le n \le N+N_{CP}-1\}$.

In some feasible implementations, provided that there is at least one first sampling point for which the estimated value of the Rx DC component can be estimated, at least one optimal first sampling point does not need to be selected. For example, all sampling points (namely, the N sampling points) in the useful symbol in the first OFDM symbol are used as the at least one first sampling point, that is, $\Lambda = \{n|N_{CP}-1 \le n \le N+N_{CP}-1\}$.

402: Sample the signal in a second time period to obtain at least one second sampling point, where the at least one second sampling point corresponds to the at least one first sampling point, and the second time period is after the first time period.

In this embodiment of this application, the second time period is a time period of a second OFDM symbol, and the first OFDM symbol and the second OFDM symbol do not overlap or partially overlap in time domain. In this embodiment of this application, signals transmitted by peer communication apparatuses corresponding to the first OFDM symbol and the second OFDM symbol are the same.

For example, if the first OFDM symbol and the second OFDM symbol partially overlap in time domain, the first OFDM symbol may be for carrying a signal corresponding to a non-high-throughput long training field (non-HT (legacy) long training field, L-LTF) 0, and the second OFDM symbol is for carrying a signal corresponding to an L-LTF1. As shown in FIG. 4-2, a first OFDM symbol is an L-LTF0 (where an index m1=0), and a second OFDM symbol is an L-LTF1 (where an index $m_2$=1). The L-LTF0 and the L-LTF1 may be used for completing a timing operation, and the L-LTF0 and the L-LTF1 are buffered, and are subsequently used for obtaining an estimated value of an Rx DC component.

For another example, if the first OFDM symbol and the second OFDM symbol do not overlap in time domain, the first OFDM symbol may be for carrying a signal corresponding to a non-high-throughput signaling field (non-HT (legacy) signaling field, L-SIG), and the second OFDM symbol may be for carrying a signal corresponding to a repeated non-high-throughput signaling field (repeated non-HT (legacy) signaling field, RL-SIG). As shown in FIG. 4-3, a first OFDM symbol is an L-SIG (where an index $m_1$=2), and a second OFDM symbol is an RL-SIG (where an index $m_2$=3).

In this embodiment of this application, sampling is performed on a signal of the second OFDM symbol, to be specific, the sampling is performed on a signal of a CP in the second OFDM symbol to obtain $N_{CP}$ sampling points, and the sampling is performed on a signal of a useful symbol in the second OFDM symbol to obtain N sampling points, to obtain $N_{CP}+N$ sampling points, where the $N+N_{CP}$ sampling points of the second OFDM symbol include the at least one second sampling point, and the at least one second sampling point may be represented as $\{r(m_2, n)|n \in \Lambda\}$.

In this embodiment of this application, a sampling point whose index is n in the $N_{CP}+N$ sampling points obtained by collecting the second OFDM symbol whose index is $m_2$ may be represented as $r(m_2, n)$, to obtain the $N_{CP}+N$ sampling points of the second OFDM symbol $\{r(m_2, n)|0 \le n \le N+N_{CP}-1\}$.

403: Obtain an estimated value of a receive end-direct current Rx DC component based on the at least one first sampling point, the at least one second sampling point, and a normalized frequency offset.

In this embodiment of this application, the estimated value of the Rx DC component obtained based on the at least one first sampling point, the at least one second sampling point, and the normalized frequency offset meets the following equation:

$$\hat{d}_R = \frac{A_{TDA}(m_1)\eta - A_{TDA}(m_2)}{\eta - 1} \qquad \text{Formula 4-1}$$

$A_{TDA}(m_1)$ is a value obtained by performing time domain averaging (time domain averaging, TDA) on the at least one first sampling point, and $A_{TDA}(m_2)$ is a value obtained by performing the TDA on the at least one second sampling point, to be specific:

$$A_{TDA}(m_1) = \frac{1}{|\Lambda|} \sum_{n \in \Lambda} r(m_1, n) \qquad \text{Formula 4-2}$$

$$A_{TDA}(m_2) = \frac{1}{|\Lambda|} \sum_{n \in \Lambda} r(m_2, n) \qquad \text{Formula 4-3}$$

$|\Lambda|$ represents a quantity of sampling points of the at least one first sampling point, $\theta_{m_1}$ represents a phase of the $1^{st}$ sampling point of the first OFDM symbol (referred to as an initial phase of the first OFDM symbol after), $\theta_{m_2}$ represents a phase of the $1^{st}$ sampling point of the second OFDM symbol (referred to as an initial phase of the second OFDM symbol after), exp( ) is an exponential function with the natural logarithm e as a base, and j represents an imaginary number symbol.

In addition, η is an intermediate variable, to be specific:

$$\eta = \exp(j(\theta_{m_2} - \theta_{m_1}))  \quad \text{Formula 4-4}$$

It should be noted that, for different first OFDM symbols and second OFDM symbols, values of $\theta_{m_2} - \theta_{m1}$ may be different.

For example, the L-LTF0 and the L-LTF1 are used as an example. As shown in FIG. 4-2, the index of the first OFDM symbol is $m_1=0$, the index of the second OFDM symbol is $m_2=1$, and L is a difference between a quantity of sampling points of the $1^{st}$ sampling point of the first OFDM symbol and a quantity of sampling points of the $1^{st}$ sampling point of the second OFDM symbol, then:

$$\theta_{m_2} - \theta_{m_1} = \frac{2\pi}{N}\varepsilon L \quad \text{Formula 4-5}$$

For another example, the L-SIG and the RL-SIG are used as an example. As shown in FIG. 4-3, the index of the first OFDM symbol is $m_1=2$, and the index of the second OFDM symbol is $m_2=3$. If $L=N+N_{GI}$, then:

$$\theta_{m_2} - \theta_{m_1} = \frac{2\pi}{N}\varepsilon L \quad \text{Formula 4-6}$$

In this embodiment of this application, based on a fact that signals sent by peer communication apparatuses of the first OFDM symbol and the second OFDM symbol are the same, for a specified data frame of one or more DC subcarriers or a field in the data frame, the estimated value of the Rx DC component may be obtained by using sampling points of the first OFDM symbol and the second OFDM symbol, to accurately obtain the estimated value of the Rx DC component, so that an unfavorable factor (the Rx DC component) caused by a receive end in the signal is eliminated, and a baseband signal is restored to a maximum extent.

404: A receiver performs compensation based on the estimated value of the Rx DC component.

Refer to step 204. Details are not described herein again.

Optionally, the signal processing method may further include the following step.

405: Obtain the normalized frequency offset.

Refer to step 205. Details are not described herein again.

Embodiment 4

Figure 5:
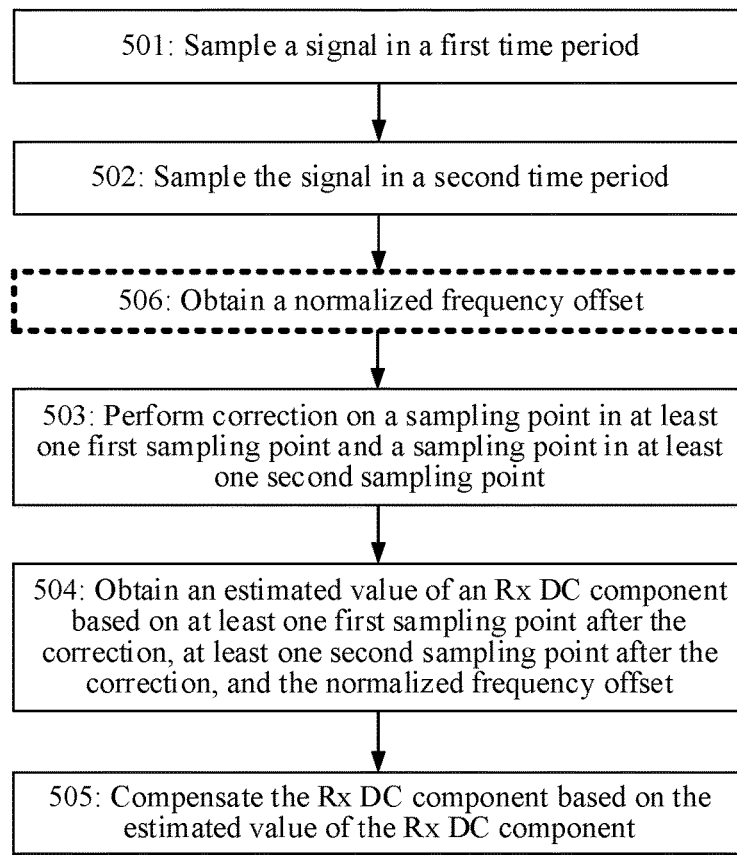
FIG. 5 is a schematic diagram of another signal processing method according to this application.

Refer to FIG. 5. Embodiment 4 of this application provides a signal processing method, and the method includes the following steps.

501: Sample a signal in a first time period, to obtain at least one first sampling point.

In this embodiment of this application, the first time period is a time period of a first OFDM symbol. In this embodiment of this application, sampling is performed on the signal of the first OFDM symbol, to obtain $N_{CP}+N$ sampling points $\{r(m_1, n)|0 \leq n \leq N+N_{CP}-1\}$ of the first OFDM symbol. For a specific sampling method, refer to step 402. Details are not described herein again.

In this embodiment of this application, the $N+N_{CP}$ sampling points of the first OFDM symbol include the at least one first sampling point, the at least one first sampling point may be represented as $\{r(m_1, n)|n \in \Lambda 1\}$, and $\Lambda 1$ is a subset of $\{n|0 \leq n \leq N+N_{CP}-1\}$, where $m_1$ represents an index of the first OFDM symbol, $r(m_1, n)$ represents a sampling point whose index is n in the first OFDM symbol, $N_{CP}$ represents a quantity of sampling points of a CP in the first OFDM symbol, and N represents a quantity of sampling points of a useful symbol in the first OFDM symbol.

In some feasible implementations, the at least one first sampling point may be all sampling points of the useful symbol in the first OFDM symbol, that is, $\Lambda 1 = \{n|N_{CP} \leq n \leq N+N_{CP}-1\}$. In some possible implementations, because the CP in the first OFDM symbol is a copy of the last segment of the useful symbol in the first OFDM symbol, the at least one first sampling point may alternatively be any N consecutive sampling points in the first OFDM symbol, and an obtained sampling point is equivalent to $\{r(m_1, n)\ N_{CP} \leq n \leq N+N_{CP}-1\}$. In some possible implementations, because the first several sampling points of the CP in the first OFDM symbol are interfered with by a previous OFDM symbol, when the at least one first sampling point is selected from the first OFDM symbol, the first several sampling points of the CP in the first OFDM symbol may be prevented from being selected.

In this embodiment of this application, the at least one first sampling point may alternatively be a plurality of sampling points evenly distributed in the N sampling points of the useful symbol in the first OFDM symbol. In this case, when the sampling points in the at least one first sampling point are accumulated, a value of a center frequency, to be specific, a value of a specified frequency at which no signal is sent, on the useful symbol in the first OFDM symbol may be obtained, to subsequently obtain an estimated value of an Rx DC component.

For example, indexes of all sampling points of the at least one first sampling point are congruential to a positive integer, for example, congruential to 2, a sampling point whose index is an odd number in the sampling points of the first OFDM symbol is selected, or a sampling point whose index is an even number in the sampling points of the first OFDM symbol is selected; or for example, congruential to 3, sampling points whose indexes are 1, 4, 7, 11 . . . in the sampling points of the first OFDM symbol are selected, provided that a plurality of evenly distributed sampling points can be determined from the N sampling points of the useful symbol in the first OFDM symbol. This is not limited herein.

In this embodiment of this application, an example in which the N sampling points of the useful symbol in the first OFDM symbol are used as the at least one first sampling point is used for description, that is, the at least one first sampling point is $\{r(m_1, n)|N_{CP} \leq n \leq N+N_{CP}-1\}$.

502: Sample the signal in a second time period to obtain at least one second sampling point, where the at least one second sampling point corresponds to the at least one first sampling point, and the second time period is after the first time period.

In this embodiment of this application, a signal of the second OFDM symbol is sampled to obtain $N_{CP}+N$ sampling points $\{r(m_2, n)|0 \leq n \leq N+N_{CP}-1\}$ of the second OFDM symbol. A sampling method is the same as the method for sampling the signal of the first OFDM symbol in step 402. Details are not described herein again.

In this embodiment of this application, the $N+N_{CP}$ sampling points of the second OFDM symbol include the at least one second sampling point, the at least one second sampling point may be represented as $\{r(m_2, n)|n \in \Lambda 2\}$, and $\Lambda 2$ is a subset of $\{n|0 \leq n \leq N+N_{CP}-1\}$, where $m_2$ represents an index of the second OFDM symbol, $r(m_2, n)$ represents a sampling point whose index is n in the second OFDM symbol, $N_{CP}$ represents a quantity of sampling points of a CP in the second OFDM symbol, and N represents a quantity of sampling points of a useful symbol in the second OFDM symbol.

In this embodiment of this application, signals sent by peer communication apparatuses corresponding to the second OFDM symbol and the first OFDM symbol may be different or may be the same. In other words, $s(m_1, n)$ ($n \in \Lambda 1$) and $s(m_2, n)$ ($n \in \Lambda 2$) may be equal or different. This is not limited herein.

In some feasible implementations, the at least one second sampling point may be all sampling points of the useful symbol in the second OFDM symbol, that is, $\Lambda 2=\{n|N_{CP} \leq n \leq N+N_{CP}-1\}$. In some possible implementations, because the CP in the second OFDM symbol is a copy of the last segment of the useful symbol in the second OFDM symbol, the at least one second sampling point may alternatively be any N consecutive sampling points in the second OFDM symbol, and an obtained sampling point is equivalent to $\{r(m_2, n)|N_{CP} \leq n \leq N+N_{CP}-1\}$. In some possible implementations, because the first several sampling points of the CP in the second OFDM symbol are interfered with by a previous OFDM symbol, when the any N consecutive sampling points in the second OFDM symbol are selected as the at least one second sampling point, the first several sampling points of the CP in the second OFDM symbol may be prevented from being selected.

In this embodiment of this application, the at least one second sampling point may further be a plurality of sampling points evenly distributed in the N sampling points of the useful symbol in the second OFDM symbol. In this case, when the sampling points in the at least one second sampling point are accumulated, a value of a center frequency domain, that is, at a specified frequency at which no signal is sent, on the useful symbol in the second OFDM symbol may be theoretically obtained, and signals sent by a corresponding peer communication apparatuses are accumulated to obtain 0, to obtain an estimated value of an Rx DC component subsequently.

For example, indexes of all sampling points of the at least one second sampling point are congruential to the positive integer, for example, congruential to 2, a sampling point whose index is the odd/even number in the sampling points of the second OFDM symbol is selected; or for example, congruential to 3, sampling points whose indexes are 1, 4, 7, 11 . . . in the sampling points of the second OFDM symbol are selected, provided that a plurality of evenly distributed sampling points can be determined from the N sampling points of the useful symbol in the second OFDM symbol. This is not limited herein.

In this embodiment of this application, an example in which the N sampling points of the useful symbol in the second OFDM symbol are used as the at least one second sampling point is used for description. To be specific, the at least one second sampling point is $\{r(m_2, n)|N_{CP} \leq n \leq N+N_{CP}-1\}$, and the at least one second sampling point is $\{r(m_2, n)|n \in \Lambda 2\}$.

503: Perform correction on the at least one first sampling point and the at least one second sampling point, to obtain at least one first sampling point after the correction and at least one second sampling point after the correction.

In this embodiment of this application, after the correction is performed on $r(m_1, n)$, $r_1(m_1, n)$ is obtained:

$$r_1(m_1, n) = r(m_1, n) \cdot \exp\left(-j\left(\frac{2\pi}{N}\varepsilon n + \theta 1_{m_1}\right)\right) \quad \text{Formula 5-1}$$

$$\theta 1_{m_1} = \theta_{m_1} - \theta_g = \sum_{l=g}^{m_1-1} \frac{2\pi}{N}\varepsilon L_l \quad \text{Formula 5-2}$$

$L_l$ represents a difference between a quantity of sampling points of the first sampling point of an OFDM symbol whose index is l and a quantity of sampling points of the first sampling point of an OFDM symbol whose index is l+1, $\theta_{m_1}$ represents an initial phase of the first OFDM symbol, $\theta_g$ represents an initial phase of the first sampling point of an OFDM symbol whose index is g, and $\varepsilon$ represents a normalized frequency offset. For example, if $g=0$, $\theta_g=\theta_0$, that is:

$$\theta 1_{m_1} = \theta_{m_1} - \theta_0 = \sum_{l=0}^{m_1-1} \frac{2\pi}{N}\varepsilon L_l \quad \text{Formula 5-3}$$

In this embodiment of this application, after the correction is performed on $r(m_2, n)$, $r_1(m_2, n)$ is obtained:

$$r_1(m_2, n) = r(m_2, n) \cdot \exp\left(-j\left(\frac{2\pi}{N}\varepsilon n + \theta 1_{m_2}\right)\right) \quad \text{Formula 5-4}$$

$$\theta 1_{m_2} = \theta_{m_2} - \theta_g = \sum_{l=g}^{m_2-1} \frac{2\pi}{N}\varepsilon L_l \quad \text{Formula 5-5}$$

$\theta_{m_2}$ represents an initial phase of the second OFDM symbol. For example, if $g=0$, $\theta_g=\theta_0$, to be specific:

$$\theta 1_{m_2} = \theta_{m_2} - \theta_0 = \sum_{l=0}^{m_2-1} \frac{2\pi}{N}\varepsilon L_l \quad \text{Formula 5-6}$$

504: Obtain the estimated value of the Rx DC component based on the at least one first sampling point after the correction, the at least one second sampling point after the correction, and the normalized frequency offset.

In this embodiment of this application, the estimated value of the receive end-direct current Rx DC component obtained based on the at least one first sampling point, the at least one second sampling point, and the normalized frequency offset meets the following equation:

$$\hat{d}_R = \frac{A1_{TDA}(m_1) - A1_{TDA}(m_2)}{\eta(m_1) - \eta(m_2)} \quad \text{Formula 5-7}$$

$A1_{TDA}(m_1)$ is a value obtained by performing TDA on the at least one first sampling point, and $A1_{TDA}(m_2)$ is a value obtained by performing the TDA on the at least one second sampling point, to be specific:

$$A1_{TDA}(m_1) = \frac{1}{|\Lambda 1|} \sum_{n \in \Lambda 1} r_1(m_1, n) \quad \text{Formula 5-8}$$

$$A1_{TDA}(m_2) = \frac{1}{|\Lambda 2|} \sum_{n \in \Lambda 2} r_1(m_2, n) \quad \text{Formula 5-9}$$

In addition:

$$\eta(m_1) = \frac{1}{|\Lambda 1|} \sum_{n \in \Lambda 1} \exp\left(-j\left(\frac{2\pi}{N}\varepsilon n + \theta 1_{m_1}\right)\right) \quad \text{Formula 5-10}$$

$$\eta(m_2) = \frac{1}{|\Lambda 2|} \sum_{n \in \Lambda 2} \exp\left(-j\left(\frac{2\pi}{N}\varepsilon n + \theta 1_{m_2}\right)\right) \quad \text{Formula 5-11}$$

In this embodiment of this application, based on uniform sampling performed on the useful symbols of the first OFDM symbol and the second OFDM symbol, the at least one first sampling point and the at least one second sampling point are obtained. For a specified data frame of one or more DC subcarriers or a field in the data frame, the estimated value of the Rx DC component may be obtained by using the at least one first sampling point and the at least one second sampling point, to accurately obtain the estimated value of the Rx DC component, so that an unfavorable factor (the Rx DC component) caused by a receive end in the signal is eliminated, and a baseband signal is restored to a maximum extent.

505: Compensate the Rx DC component based on the estimated value of the Rx DC component.

Refer to step 204. Details are not described herein again.

Optionally, the signal processing method may further include the following step.

506: Obtain the normalized frequency offset.

Refer to step 205. Details are not described herein again.

Embodiment 5

Figure 6:
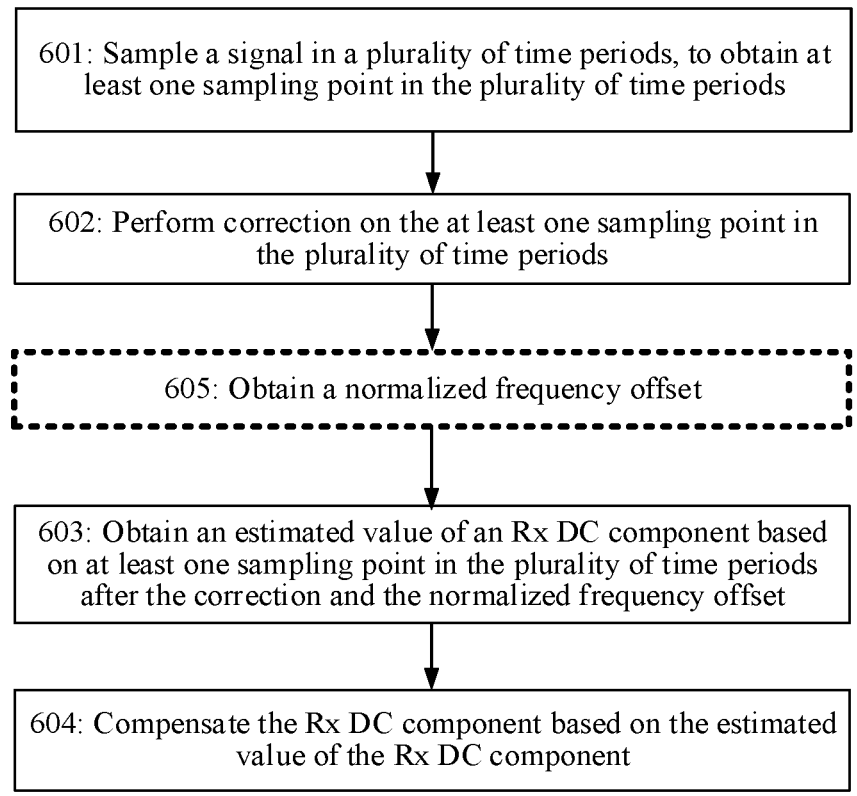
FIG. 6 is a schematic diagram of another signal processing method according to this application.

Refer to FIG. 6. Embodiment 5 of this application provides a signal processing method, and the method includes the following steps.

601: Sample a signal in a plurality of time periods, to obtain at least one sampling point in the plurality of time periods.

For a sampling method, refer to steps 502 and 503. Details are not described herein again. For example, the plurality of time periods are a plurality of OFDM symbols respectively, for example, M OFDM symbols, where M is an integer greater than 2. According to formula 5-1, using sampling performed on signals of the M OFDM symbols as an example, $\{r(m_i, n)|n \in \Lambda i\}$ ($i=1, 2, \ldots, M$) is a sampling point obtained through uniform sampling performed on useful symbols in an OFDM symbol whose index is $m_i$, and $\Lambda i$ is a subset of $\{n|0 \leq n \leq N+N_{CP}-1\}$. For a implementation, refer to step 502. Details are not described herein again.

For example, all sampling points of the useful symbols in the M OFDM symbols are selected, to obtain M groups of at least one sampling point $\{r(m_i, n)|N_{CP} \leq n \leq N+N_{CP}-1\}$ (i1, 2, …, M).

602: Perform correction on the at least one sampling point in the plurality of time periods, to obtain at least one sampling point in the plurality of time periods after the correction.

For a correction method, refer to step 504. Details are not described herein again. For example, the correction is performed on the M groups of at least one sampling point, to obtain M groups of at least one sampling point $\{r_1(m_i, n)|n \in \Lambda i\}$ ($i=1, 2, \ldots, M$) after the correction.

603: Obtain an estimated value of an Rx DC component based on the at least one sampling point of the plurality of time periods after the correction and a normalized frequency offset.

In this embodiment of this application, the estimated value of the receive end-direct current Rx DC component obtained based on at least one first sampling point, at least one second sampling point, and the normalized frequency offset meets the following equation:

$$\begin{bmatrix} \hat{d}_T \\ \hat{d}_R \end{bmatrix} = (P^H P)^{-1} P^H A \quad \text{Formula 6-1}$$

$(\cdot)^H$ represents conjugate transposition, $(\cdot)^{-1}$ represents matrix inversion, and $\hat{d}_T$ represents an estimated value of a Tx DC component.

$$P = \begin{bmatrix} 1 & \eta(m_1) \\ 1 & \eta(m_2) \\ \vdots & \vdots \\ 1 & \eta(m_M) \end{bmatrix} \quad \text{Formula 6-2}$$

$$A = \begin{bmatrix} A1_{TDA}(m_1) \\ A1_{TDA}(m_2) \\ \vdots \\ A1_{TDA}(m_M) \end{bmatrix} \quad \text{Formula 6-3}$$

$A1_{TDA}(m_i)$ ($i=1, 2, 3, \ldots, M$) is an average value of each group of at least one sampling point in the M groups of at least one sampling point after the correction.

$$\eta(m_i) = \frac{1}{|\Lambda i|} \sum_{n \in \Lambda i} \exp\left(-j\left(\frac{2\pi}{N}\varepsilon n + \theta 1_{m_i}\right)\right) \quad \text{Formula 6-4}$$

$\varepsilon$ represents the normalized frequency offset.

For a value of $\theta_{m_i}$, refer to formula 5-2 and formula 5-5 in Embodiment 4. Details are not described herein again.

In this embodiment of this application, based on uniform sampling performed on the useful symbols of the plurality of OFDM symbols, a plurality of groups of at least one sampling point are obtained. For a specified data frame of one or more DC subcarriers or a field in the data frame, the estimated value of the Rx DC component may be obtained by using the plurality of groups of at least one sampling point, to accurately obtain the estimated value of the Rx DC component, so that an unfavorable factor (the Rx DC component) caused by a receive end in the signal is eliminated, and a baseband signal is restored to a maximum extent.

604: Compensate the Rx DC component based on the estimated value of the Rx DC component.

Refer to step 204. Details are not described herein again.

Optionally, the signal processing method may further include the following step.

605: Obtain the normalized frequency offset.

For details, refer to step 205. Details are not described herein again.

Embodiment 6

Figure 7:
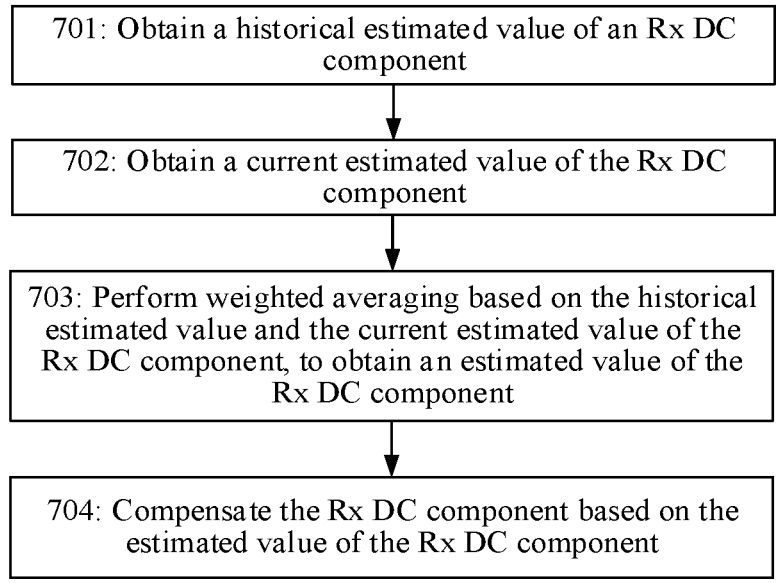
FIG. 7 is a schematic diagram of another signal processing method according to this application.

Refer to FIG. 7. Embodiment 6 of this application provides a signal processing method, and the method includes the following steps.

701: Obtain a historical estimated value of an Rx DC component.

In this embodiment of this application, the historical estimated value of the Rx DC component includes a plurality of estimated values, and any estimated value may be obtained through any method in Embodiment 1 to Embodiment 5.

702: Obtain a current estimated value of the Rx DC component.

In this embodiment of this application, for a method for calculating the current estimated value of the Rx DC component, refer to any method in Embodiment 1 to Embodiment 5. Details are not described herein again.

703: Perform weighted averaging based on the historical estimated value and the current estimated value of the Rx DC component, to obtain an estimated value of the Rx DC component.

In some possible implementations, the weighted averaging may be performed based on the historical estimated value and the current estimated value of the Rx DC component through a method of fixed coefficient alpha (alpha) filtering, to obtain the estimated value of the Rx DC component. The following provides detailed descriptions.

For example, there are h−1 historical estimated values of the Rx DC component, which are $\hat{d}_R(m)$, (i=1, 2, . . . , h−1). The current estimated value of the Rx DC component is $\hat{d}_R(m_h)$, where $m_i$ is an index of an OFDM symbol, and $\hat{d}_R(i)$ represents an estimated value of the Rx DC component calculated when a communication apparatus receives the OFDM symbol whose index is $m_i$. A same method (for example, a method in a same embodiment) may be used to calculate different $\hat{d}_R(m_i)$, or different methods (for example, methods in different embodiments) may be used to calculate different $\hat{d}_R(m_i)$. This is not limited herein. In some feasible implementations, in a time sequence, the OFDM symbol whose index is $m_i$ is earlier than the OFDM symbol whose index is $m_{i+1}$. Optionally, the OFDM symbol whose index is $m_{i+1}$ is a next OFDM symbol of the OFDM symbol whose index is $m_i$.

The weighted averaging is performed on $\hat{d}_R(m_i)$ (i=1, 2, . . . , h) through a method of fixed coefficient alpha (alpha) filtering, to obtain $\hat{d}_R(m_h)$:

$$\tilde{d}_R(m_h) = \begin{cases} \hat{d}_R(m_h), & h = 1 \\ \alpha \cdot \tilde{d}_R(m_{h-1}) + (1-\alpha) \cdot \hat{d}_R(m_h), & h > 1 \end{cases} \quad \text{Formula 7-1}$$

$\tilde{d}_R(m_h)$ obtained in the foregoing implementation is used as the estimated value of the Rx DC component.

According to formula 7-1, a value of α ranges from 0 to 1. A closer value of α to 1 indicates a larger component occupied by $\tilde{d}_R(m_{h-1})$, and a closer value of α to 0 indicates a smaller component occupied by $\tilde{d}_R(m_{h-1})$. If α=0, it is equivalent to that the fixed coefficient alpha (alpha) filtering is not performed, and $\hat{d}_R(m_h)$ is directly selected as the estimated value of the Rx DC component.

When $$\alpha = 1 - \frac{1}{h}, \tilde{d}_R(m_l)$$

is an arithmetic average value of the historical estimated value and the current estimated value $\hat{d}_R(i)$ of the Rx DC component. For example, $\hat{d}_R(m_2) = \frac{1}{2}\hat{d}_R(m_1) + \frac{1}{2}\hat{d}_R(m_2)$, $\hat{d}_R(m_2)$ is an arithmetic average value of $\hat{d}_R(m_1)$ and $\hat{d}_R(m_2)$; and $\tilde{d}_R(m_3) = \frac{2}{3}\hat{d}_R(m_2) + \frac{1}{3}\hat{d}_R(m_3) = \frac{2}{3}[\frac{1}{2}\hat{d}_R(m_1) + \frac{1}{2}\hat{d}_R(m_2)] + \frac{1}{3}\hat{d}_R(m_3) = \frac{1}{3}\hat{d}_R(m_1) + \frac{1}{3}\hat{d}_R(m_2) + \frac{1}{3}\hat{d}_R(M_3)$, where $\tilde{d}_R(m_3)$ is an arithmetic average value of $\hat{d}_R(m_1)$, $\hat{d}_R(m_2)$, and $\hat{d}_R(m_3)$.

In some feasible implementations, a changes with h, is denoted as $\alpha_h$, and is referred to as variable coefficient alpha (alpha) filtering. To be specific:

$$\tilde{d}_R(m_h) = \begin{cases} \hat{d}_R(m_h), & h = 1 \\ \alpha_h \cdot \tilde{d}_R(m_{h-1}) + (1-\alpha_h) \cdot \hat{d}_R(m_h), & h > 1 \end{cases} \quad \text{Formula 7-2}$$

In some possible implementations, the weighted averaging may be further performed through a method of combining the fixed coefficient (alpha) filtering and the variable coefficient (alpha) filtering. For example, when $1 \leq h1 < M_1$, $\alpha_{h1}$ changes with h1; and when $M_1 \leq h2 \leq M$, $\alpha_{h2}$ does not change with h2 (where $1 < M_1 \leq M$). This is not limited herein.

In this embodiment of this application, the weighted averaging is performed on the historical estimated value and the current estimated value of the Rx DC component, to improve accuracy of estimating the Rx DC component. In addition, different methods or method combinations may be selected for different processing delay requirements, so that flexibility is high.

704: Compensate the Rx DC component based on the estimated value of the Rx DC component.

Refer to step 204. Details are not described herein again.

It should be noted that, for brief description, the foregoing method embodiments are represented as a series of actions. However, a person skilled in the art should appreciate that this application is not limited to the described order of the actions, because according to this application, some steps may be performed in other orders or simultaneously. It should be further appreciated by a person skilled in the art that embodiments described in this specification all belong to example embodiments, and the involved actions and modules are not necessarily required by this application.

To better implement the solutions of embodiments of this application, a related apparatus for implementing the solutions is further provided below.

Figure 8:
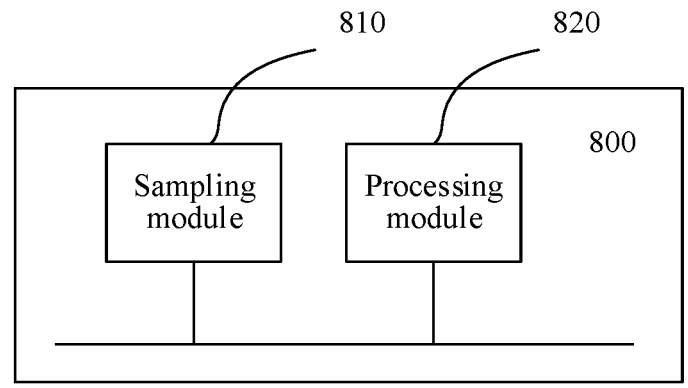
FIG. 8 is a schematic diagram of a communication apparatus according to an embodiment of this application.

FIG. 8 is a schematic diagram of a communication apparatus according to an embodiment of this application. The communication apparatus is configured to implement the steps in the foregoing embodiments. As shown in FIG. 8, the communication apparatus 800 includes a sampling module 810 and a processing module 820.

The sampling module 810 is configured to: sample a signal in a first time period to obtain at least one first sampling point, and sample the signal in a second time period to obtain at least one second sampling point, where the at least one second sampling point corresponds to the at least one first sampling point, and the second time period is after the first time period. The processing module 820 is configured to: obtain an estimated value of an Rx DC component based on the at least one first sampling point, the at least one second sampling point, and a normalized frequency offset, where the estimated value of the Rx DC component represents an amplitude and a phase of the Rx DC component, and the normalized frequency offset represents a frequency offset of the Rx DC component relative to a DC subcarrier; and then compensate the Rx DC component based on the estimated value of the Rx DC component. In this case, for a specified data frame of one or more DC subcarriers or a field in the data frame, the estimated value of the Rx DC component may be obtained, so that the Rx DC component can be compensated based on the estimated value of the Rx DC component, to eliminate an unfavorable factor (the Rx DC component) caused by a receive end in the signal, and restore a baseband signal to a maximum extent.

In some feasible implementations, the first time period is a time period of a CP in a first OFDM symbol, and the second time period is a time period other than that of the CP in the first OFDM symbol. The at least one first sampling point is $\{r(n)|n\in\Lambda\}$, r(n) represents a sampling point whose index is n in the first OFDM symbol, $\Lambda$ is a subset of $\{n|0\le n\le N_{CP}-1\}$, and $N_{CP}$ is a quantity of sampling points of the CP in the first OFDM symbol; and the at least one second sampling point is $\{r(n+N)|n\in\Lambda\}$, r(n+N) represents a sampling point whose index is n+N in the first OFDM symbol, and N is a quantity of sampling points in a part other than the CP in the first OFDM symbol. In the foregoing implementation, based on a fact that the CP in the first OFDM symbol is a copy of the last segment of a useful symbol, and with reference to front and rear sampling points in the first OFDM symbol, for the specified data frame of the one or more DC subcarriers or the field in the data frame, the estimated value of the Rx DC component may be accurately obtained. Because the estimated value of the Rx DC may be obtained by obtaining a sampling point of a signal of only one OFDM symbol, feasibility is high.

In some feasible implementations, $\Lambda$ is $\{n|0\le n\le N_{CP}-1\}$, all sampling points of a signal on the CP in the first OFDM symbol and a corresponding sampling point of a signal on the useful symbol are used, and there is no need to further screen the sampling point $\{r(n)|0\le n\le N_{CP}-1\}$ of the signal on the CP in the first OFDM symbol. This is simple to implement, and improves feasibility.

In some feasible implementations, the first time period is a time period of the first OFDM symbol, the second time period is a time period of a second OFDM symbol, and the first OFDM symbol and the second OFDM symbol do not overlap or partially overlap in time domain. The at least one first sampling point is $\{r(m_1, n)|n\in\Lambda1\}$, $m_1$ is an index of the first OFDM symbol, and $r(m_1, n)$ represents a sampling point whose index is n in the first OFDM symbol, where $\Lambda1$ is a subset of $\{n|0\le n\le N+N_{CP}-1\}$, $N_{CP}$ is a quantity of sampling points of the CP in the first OFDM symbol and a quantity of sampling points of a CP in the second OFDM symbol, and N is a quantity of sampling points in the part other than the CP in the first OFDM symbol and a quantity of sampling points in a part other than the CP in the second OFDM symbol. The at least one second sampling point is $\{r(m_2, n)|n\in\Lambda2\}$, $m_2$ is an index of the second OFDM symbol, $r(m_2, n)$ represents a sampling point whose index is n in the second OFDM symbol, where $\Lambda2$ is a subset of $\{n|0\le n\le N+N_{CP}-1\}$. In this implementation, with reference to sampling points of the first OFDM symbol and the second OFDM symbol, for the specified data frame of the one or more DC subcarriers or the field in the data frame, the estimated value of the Rx DC component may be obtained. Because the estimated value of the Rx DC component can be obtained by obtaining only sampling points of signals of two OFDM symbols, feasibility is high.

In some feasible implementations, if the first OFDM symbol and the second OFDM symbol do not overlap in time domain, the first OFDM symbol is for carrying a signal corresponding to an L-LTF0, and the second OFDM symbol is for carrying a signal corresponding to an L-LTF1. Signals corresponding to the L-LTF0 and the L-LTF1 are common signals that are easily obtained, and are for obtaining the estimated value of the Rx DC component. Therefore, feasibility is high.

In some feasible implementations, if the first OFDM symbol and the second OFDM symbol partially overlap in time domain, the first OFDM symbol is for carrying a signal corresponding to an L-SIG, and the second OFDM symbol is for carrying a signal corresponding to an RL-SIG. Signals corresponding to the L-SIG and the RL-SIG are common signals that are easily obtained, and are for obtaining the estimated value of the Rx DC component. Therefore, feasibility is high.

In some feasible implementations, $\Lambda1=\Lambda2=\{n|N_{CP}\le n\le N+N_{CP}-1\}$, all sampling points of the useful symbol in the first OFDM symbol and the second OFDM symbol are used, and there is no need to further screen a sampling point of the signal on the useful symbol. This is simple to implement, and improves feasibility.

In some feasible implementations, the processing module 820 is configured to: perform correction on a sampling point in the at least one first sampling point and a sampling point in the at least one second sampling point, to obtain at least one first sampling point after the correction and at least one second sampling point after the correction, and then an estimated value of an Rx DC component is obtained based on the at least one first sampling point after the correction, the at least one second sampling point after the correction, and the normalized frequency offset. Therefore, the estimated value of the Rx DC component is obtained based on the at least one first sampling point $\{r_1(n)|n\in\Lambda\}$ after the correction, the at least one second sampling point $\{r_1(n+N)|n\in\Lambda\}$ after the correction, and the normalized frequency offset $\varepsilon$.

In some feasible implementations, if the normalized frequency offset is less than or equal to a preset threshold, the processing module 820 is further configured to determine that the estimated value of the Rx DC component is 0; and if the normalized frequency offset is greater than the preset threshold, the processing module 820 is configured to: obtain the estimated value of the Rx DC component based on the at least one first sampling point, the at least one second sampling point, and the normalized frequency offset. Therefore, the estimated value of the Rx DC component does not need to be obtained, and processing complexity is reduced, so that power consumption is reduced.

It should be noted that, content such as information exchange between modules/units of the apparatus and the execution processes thereof is based on the same idea as method embodiments of this application, and produces the same technical effects as the method embodiments of this application. For detailed content, refer to the foregoing descriptions in the method embodiments of this application. Details are not described herein again.

Optionally, the communication apparatus may further include a storage unit. The storage unit is configured to store data or instructions (which may also be referred to as code or programs). The foregoing units may interact with or be coupled to the storage unit, to implement a corresponding method or function. For example, the processing module 820 may read the data or the instructions in the storage unit, so that the communication apparatus implements the methods in the foregoing embodiments.

It should be understood that division into the units in the communication apparatus is merely logical function division. In an actual implementation, all or some of the units may be integrated into one physical entity, or may be physically separated. In addition, all the units in the communication apparatus may be implemented in a form of software invoked by a processing element, or may be implemented in a form of hardware; or some units may be implemented in a form of software invoked by a processing element, and some units may be implemented in a form of hardware. For example, each unit may be a separately disposed processing element, or all units may be integrated into a chip of the communication apparatus for implementation. In addition, each unit may alternatively be stored in a memory in a form of a program to be invoked by a processing element of the communication apparatus to perform a function of the unit. In addition, all or some of the units may be integrated, or may be implemented independently. The processing element herein may also be referred to as a processor, and may be an integrated circuit having a signal processing capability. During implementation, steps in the foregoing methods or the foregoing units may be implemented through a hardware integrated logic circuit in a processor element, or may be implemented in the form of software invoked by the processing element.

In an example, the unit in any one of the foregoing communication apparatuses may be one or more integrated circuits configured to implement the foregoing methods, for example, one or more application-specific integrated circuits (application-specific integrated circuits, ASICs), one or more microprocessors (digital signal processors, DSPs), one or more field programmable gate arrays (field programmable gate arrays, FPGAs), or a combination of at least two of these integrated circuit forms. For another example, when the units in the communication apparatus may be implemented in a form of scheduling a program by the processing element, the processing element may be a general purpose processor, for example, a central processing unit (central processing unit, CPU) or another processor that can invoke the program. For still another example, the units may be integrated and implemented in a form of a system-on-a-chip (system-on-a-chip, SOC).

Figure 9:
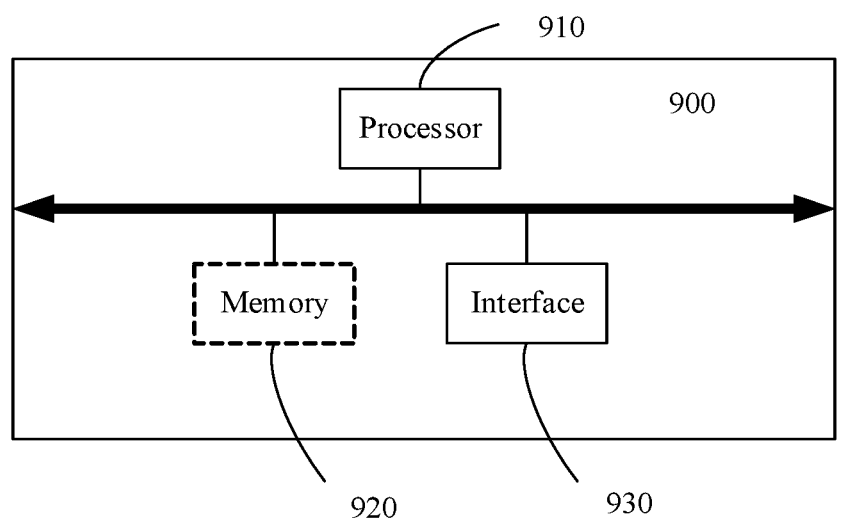
FIG. 9 is a schematic diagram of another communication apparatus according to an embodiment of this application.

FIG. 9 is a schematic diagram of a communication apparatus according to an embodiment of this application, to implement operations of the communication apparatus in the foregoing embodiments. As shown in FIG. 9, the communication apparatus 900 includes a processor 910 and an interface 930. The processor 910 is coupled to the interface 930. The interface 930 is configured to communicate with another device. The interface 930 may be a transceiver or an input/output interface. The interface 930 may be, for example, an interface circuit. Optionally, the communication apparatus may further include a memory 920, configured to store instructions executed by the processor 910, store input data for the processor 910 to run instructions, or store data generated after the processor 910 runs instructions.

The methods performed by the communication apparatus in the foregoing embodiments may be implemented by the processor 910 by invoking a program stored in a memory (which may be the memory 920 in the communication apparatus, or may be an external memory). To be specific, the communication apparatus may include the processor 910, and the processor 910 invokes the program in the memory, to perform the methods performed by the communication apparatus in the foregoing method embodiments. The processor herein may be an integrated circuit having a signal processing capability, for example, a CPU. The communication apparatus may be implemented by one or more integrated circuits configured to implement the foregoing methods, for example, one or more ASICs, one or more microprocessors DSPs, one or more FPGAs, or a combination of at least two of the integrated circuit forms. Alternatively, the foregoing implementations may be combined.

Specifically, functions/implementation processes of the sampling module 810 and the processing module 820 in FIG. 8 may be implemented by the processor 910 in the communication apparatus 900 shown in FIG. 9 by invoking computer-executable instructions stored in the memory 920. Alternatively, a function/an implementation process of the processing module 820 in FIG. 8 may be implemented by the processor 910 in the communication apparatus 900 shown in FIG. 9 by invoking computer-executable instructions stored in the memory 920, and a function/an implementation process of the sampling module 810 in FIG. 8 may be implemented by the interface 930 in the communication apparatus 900 shown in FIG. 9. For example, the function/the implementation process of the sampling module 810 may be implemented by a processor by invoking program instructions in a memory to drive the interface 930.

When the communication apparatus is a chip used in a terminal device, the chip in the terminal device implements a function of the terminal device in the foregoing method embodiments. The chip in the terminal device receives information from another module (for example, a radio frequency module or an antenna) in the terminal device, where the information is from another terminal device or a network device; or the chip in the terminal device sends information to another module (for example, a radio frequency module or an antenna) in the terminal device, where the information is sent by the terminal device to another terminal device or a network device.

When the communication apparatus is the chip used in the network device, the chip in the network device implements a function of the network device in the foregoing method embodiments. The chip in the network device receives the information from another module (for example, the radio frequency module or the antenna) in the network device, where the information is from another network device or the terminal device; or the chip in the network device sends the information to another module (for example, the radio frequency module or the antenna) in the network device, where the information is sent by the network device to another network device or the terminal device.

Embodiments of this application further provides a computer storage medium, where the computer storage medium stores a program, and the program performs a part or all of the steps described in the foregoing method embodiments.

The processor mentioned anywhere above may be a general-purpose central processing unit, a microprocessor, an ASIC, or one or more integrated circuits configured to control program execution of the methods.

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. In addition, in the accompanying drawings of the apparatus embodiments provided by this application, connection relationships between modules indicate that the modules have communication connections with each other, which may be implemented as one or more communication buses or signal cables.

Based on the descriptions of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented through corresponding hardware. Moreover, a specific hardware structure used to achieve a same function may be in various forms, for example, in a form of an analog circuit, a digital circuit, or a dedicated circuit. However, as for this application, software program implementation is a better implementation in most cases. Based on such an understanding, the technical solutions of this application essentially or a part contributing to the current technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a server, or a network device) to perform the methods described in embodiments of this application.

All or some of the foregoing embodiments may be implemented through software, hardware, firmware, or any combination thereof. When the software is used for implementing the embodiments, all or a part of the embodiments may be implemented in a form of a computer program product.

The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive, Solid State Drive (SSD)), or the like.

The invention claimed is:

1. A signal processing method, comprising:
sampling a signal in a first time period, to obtain at least one first sampling point;
sampling the signal in a second time period, to obtain at least one second sampling point, wherein the at least one second sampling point corresponds to the at least one first sampling point, and the second time period is after the first time period;
obtaining an estimated value of a receive end-direct current (Rx DC) component based on the at least one first sampling point, the at least one second sampling point, and a normalized frequency offset, wherein the estimated value of the Rx DC component represents an amplitude and a phase of the Rx DC component, and the normalized frequency offset represents a frequency offset of the Rx DC component relative to a direct current (DC) subcarrier; and
compensating the Rx DC component based on the estimated value of the Rx DC component.

2. The method of claim 1, wherein
the first time period is a time period of a cyclic prefix (CP) in a first orthogonal frequency division multiplexing (OFDM) symbol, and the second time period is a time period other than that of the CP in the first OFDM symbol;
the at least one first sampling point is $\{r(n)|n\in\Lambda\}$, $r(n)$ represents a sampling point whose index is n in the first OFDM symbol, $\Lambda$ is a subset of $\{n|0\leq n\leq N_{CP}-1\}$, and $N_{CP}$ is a quantity of sampling points of the CP in the first OFDM symbol; and
the at least one second sampling point is $\{r(n+N)|n\in\Lambda\}$, $r(n+N)$ represents a sampling point whose index is n+N in the first OFDM symbol, and N is a quantity of sampling points in a part other than the CP in the first OFDM symbol.

3. The method of claim 2, wherein $\Lambda$ is $\{n|0\leq n\leq N_{CP}-1\}$.

4. The method according to claim 1, wherein
the first time period is a time period of a first OFDM symbol, the second time period is a time period of a second OFDM symbol, and the first OFDM symbol and the second OFDM symbol do not overlap or partially overlap in time domain;
the at least one first sampling point is $\{r(m_1, n)|n\in\Lambda 1\}$, $m_1$ is an index of the first OFDM symbol, and $r(m_1, n)$ represents a sampling point whose index is n in the first OFDM symbol, wherein $\Lambda 1$ is a subset of $\{n|0\leq n\leq N+N_{CP}-1\}$, $N_{CP}$ is a quantity of sampling points of a CP in the first OFDM symbol and a quantity of sampling points of a CP in the second OFDM symbol, and N is a quantity of sampling points in a part other than the CP in the first OFDM symbol and a quantity of sampling points in a part other than the CP in the second OFDM symbol; and
the at least one second sampling point is $\{r(m_2, n)|n\in\Lambda 2\}$, $m_2$ is an index of the second OFDM symbol, and $r(m_2, n)$ represents a sampling point whose index is n in the second OFDM symbol, wherein $\Lambda 2$ is a subset of $\{n|0\leq n\leq N+N_{CP}-1\}$.

5. The method of claim 4, wherein
in a case that the first OFDM symbol and the second OFDM symbol do not overlap in time domain, the first OFDM symbol is for carrying a signal corresponding to a non-high-throughput long training field (L-LTF)0, and the second OFDM symbol is for carrying a signal corresponding to an L-LTF1.

6. The method of claim 4, wherein
in a case that the first OFDM symbol and the second OFDM symbol partially overlap in time domain, the first OFDM symbol is for carrying a signal corresponding to a non-high-throughput signaling field (L-SIG), and the second OFDM symbol is for carrying a signal corresponding to a repeated non-high-throughput signaling field (RL-SIG).

7. The method of claim 4, wherein $\Lambda 1=\Lambda 2=\{n|N_{CP}\leq n\leq N+N_{CP}-1\}$.

8. An apparatus, comprising:
one or more processors to execute instructions causing
a memory having instructions stored thereon that, when executed by the one or more processors, cause the apparatus to:
sample a signal in a first time period, to obtain at least one first sampling point;
sample the signal in a second time period, to obtain at least one second sampling point, wherein the at least one second sampling point corresponds to the at least one first sampling point, and the second time period is after the first time period;
obtain an estimated value of a receive end-direct current (Rx DC) component based on the at least one first sampling point, the at least one second sampling point, and a normalized frequency offset, wherein the estimated value of the Rx DC component represents an amplitude and a phase of the Rx DC component, and the normalized frequency offset represents a frequency offset of the Rx DC component relative to a direct current (DC) subcarrier; and compensate the Rx DC component based on the estimated value of the Rx DC component.

9. The apparatus of claim 8, wherein the first time period is a time period of a cyclic prefix (CP) in a first orthogonal frequency division multiplexing (OFDM) symbol, and the second time period is a time period other than that of the CP in the first OFDM symbol;

the at least one first sampling point is $\{r(n)|n\in\Lambda\}$, $r(n)$ represents a sampling point whose index is n in the first OFDM symbol, $\Lambda$ is a subset of $\{n|0\leq n\leq N_{CP}-1\}$, and $N_{CP}$ is a quantity of sampling points of the CP in the first OFDM symbol; and the at least one second sampling point is $\{r(n+N)|n\in\Lambda\}$, $r(n+N)$ represents a sampling point whose index is n+N in the first OFDM symbol, and N is a quantity of sampling points in a part other than the CP in the first OFDM symbol.

10. The apparatus of claim 9, wherein $\Lambda$ is $\{n|0\leq n\leq N_{CP}-1\}$.

11. The apparatus of claim 8, wherein the first time period is a time period of a first OFDM symbol, the second time period is a time period of a second OFDM symbol, and the first OFDM symbol and the second OFDM symbol do not overlap or partially overlap in time domain;

the at least one first sampling point is $\{r(m_1, n)|n\in\Lambda 1\}$, $m_1$ is an index of the first OFDM symbol, and $r(m_1, n)$ represents a sampling point whose index is n in the first OFDM symbol, wherein $\Lambda 1$ is a subset of $\{n|0\leq n\leq N+N_{CP}-1\}$, $N_{CP}$ is a quantity of sampling points of a CP in the first OFDM symbol and a quantity of sampling points of a CP in the second OFDM symbol, and N is a quantity of sampling points in a part other than the CP in the first OFDM symbol and a quantity of sampling points in a part other than the CP in the second OFDM symbol; and the at least one second sampling point is $\{r(m_2, n)|n\in\Lambda 2\}$, $m_2$ is an index of the second OFDM symbol, and $r(m_2, n)$ represents a sampling point whose index is n in the second OFDM symbol, wherein $\Lambda 2$ is a subset of $\{n|0\leq n\leq N+N_{CP}-1\}$.

12. The apparatus of claim 11, wherein in a case that the first OFDM symbol and the second OFDM symbol do not overlap in time domain, the first OFDM symbol is for carrying a signal corresponding to a non-high-throughput long training field (L-LTF)0, and the second OFDM symbol is for carrying a signal corresponding to an L-LTF1.

13. The apparatus of claim 11, wherein in a case that the first OFDM symbol and the second OFDM symbol partially overlap in time domain, the first OFDM symbol is for carrying a signal corresponding to a non-high-throughput signaling field (L-SIG), and the second OFDM symbol is for carrying a signal corresponding to a repeated non-high-throughput signaling field (RL-SIG).

14. The apparatus of claim 11, wherein $\Lambda 1=\Lambda 2=\{n|N_{CP}\leq n\leq N+N_{CP}-1\}$.

15. A non-transitory computer readable medium storing instructions that are executable by a computer, the non-transitory computer readable medium is applied to a first communication apparatus, and the instructions comprise instructions for:

sampling a signal in a first time period, to obtain at least one first sampling point;

sampling the signal in a second time period, to obtain at least one second sampling point, wherein the at least one second sampling point corresponds to the at least one first sampling point, and the second time period is after the first time period;

obtaining an estimated value of a receive end-direct current (Rx DC) component based on the at least one first sampling point, the at least one second sampling point, and a normalized frequency offset, wherein the estimated value of the Rx DC component represents an amplitude and a phase of the Rx DC component, and the normalized frequency offset represents a frequency offset of the Rx DC component relative to a direct current (DC) subcarrier; and compensating the Rx DC component based on the estimated value of the Rx DC component.

16. The non-transitory computer readable medium of claim 15, wherein the first time period is a time period of a cyclic prefix (CP) in a first orthogonal frequency division multiplexing (OFDM) symbol, and the second time period is a time period other than that of the CP in the first OFDM symbol;

the at least one first sampling point is $\{r(n)|n\in\Lambda\}$, $r(n)$ represents a sampling point whose index is n in the first OFDM symbol, $\Lambda$ is a subset of $\{n|0\leq n\leq N_{CP}-1\}$, and $N_{CP}$ is a quantity of sampling points of the CP in the first OFDM symbol; and the at least one second sampling point is $\{r(n+N)|n\in\Lambda\}$, $r(n+N)$ represents a sampling point whose index is n+N in the first OFDM symbol, and N is a quantity of sampling points in a part other than the CP in the first OFDM symbol.

17. The non-transitory computer readable medium of claim 16, wherein $\Lambda$ is $\{n|0\leq n\leq N_{CP}-1\}$.

18. The non-transitory computer readable medium of claim 15, wherein the first time period is a time period of a first OFDM symbol, the second time period is a time period of a second OFDM symbol, and the first OFDM symbol and the second OFDM symbol do not overlap or partially overlap in time domain;

the at least one first sampling point is $\{r(m_1, n)|n\in\Lambda 1\}$, $m_1$ is an index of the first OFDM symbol, and $r(m_1, n)$ represents a sampling point whose index is n in the first OFDM symbol, wherein $\Lambda 1$ is a subset of $\{n|0\leq n\leq N+N_{CP}-1\}$, $N_{CP}$ is a quantity of sampling points of a CP in the first OFDM symbol and a quantity of sampling points of a CP in the second OFDM symbol, and N is a quantity of sampling points in a part other than the CP in the first OFDM symbol and a quantity of sampling points in a part other than the CP in the second OFDM symbol; and the at least one second sampling point is $\{r(m_2, n)|n\in\Lambda 2\}$, $m_2$ is an index of the second OFDM symbol, and $r(m_2, n)$ represents a sampling point whose index is n in the second OFDM symbol, wherein $\Lambda 2$ is a subset of $\{n|0\leq n\leq N+N_{CP}-1\}$.

19. The non-transitory computer readable medium of claim 18, wherein in a case that the first OFDM symbol and the second OFDM symbol do not overlap in time domain, the first OFDM symbol is for carrying a signal corresponding to a non-high-throughput long training field (L-LTF)0, and the second OFDM symbol is for carrying a signal corresponding to an L-LTF1.

20. The non-transitory computer readable medium of claim 18, wherein in a case that the first OFDM symbol and the second OFDM symbol partially overlap in time domain, the first OFDM symbol is for carrying a signal corresponding to a non-high-throughput signaling field (L-SIG), and the second OFDM symbol is for carrying a signal corresponding to a repeated non-high-throughput signaling field (RL-SIG).

* * * * *